(12) United States Patent
Weinberg et al.

(10) Patent No.: US 6,910,044 B2
(45) Date of Patent: Jun. 21, 2005

(54) METHOD AND APPARATUS FOR STRUCTURING, MAINTAINING, AND USING FAMILIES OF DATA

(75) Inventors: Paul N. Weinberg, Los Angeles, CA (US); Ariel Hazi, Los Angeles, CA (US); Dave L. Sullivan, North Hollywood, CA (US); Philip A. Tinari, Beverly Hills, CA (US); Alexander K. Alexandrov, Sherman Oaks, CA (US); David E. Brookler, Los Angeles, CA (US)

(73) Assignee: SAP Aktiengesellschaft, Waldorf (DE)

( * ) Notice: Subject to any disclaimer, the term of this patent is extended or adjusted under 35 U.S.C. 154(b) by 225 days.

(21) Appl. No.: 09/960,902

(22) Filed: Sep. 20, 2001

(65) Prior Publication Data

US 2002/0087510 A1 Jul. 4, 2002

Related U.S. Application Data

(60) Provisional application No. 60/234,015, filed on Sep. 20, 2000.

(51) Int. Cl.$^7$ .......................... G06F 17/30; G06F 17/00
(52) U.S. Cl. ....................................................... 707/101
(58) Field of Search ............................. 707/1–10, 100, 707/101, 102, 200, 205

(56) References Cited

U.S. PATENT DOCUMENTS 5,485,550 A * 1/1996 Dalton ........................ 706/52
5,933,820 A * 8/1999 Beier et al. .................... 707/1
6,195,661 B1 * 2/2001 Filepp et al. ................ 707/102
6,633,882 B1 * 10/2003 Fayyad et al. .............. 707/101

OTHER PUBLICATIONS

U.S. Appl. No. 09/577,268.
U.S. Appl. No. 09/643,208.
U.S. Appl. No. 09/643,316.
U.S. Appl. No. 09/643,207.
U.S. Appl. No. 09/960,541.

* cited by examiner

Primary Examiner—Safet Metjahic
Assistant Examiner—Marc R Filipczyk
(74) Attorney, Agent, or Firm—Dalina Law Group, P.C.

(57) ABSTRACT

The invention describes a method and apparatus for structuring, maintaining, and using families of data. According to the invention, given one or more sets of partitioning data, one may construct a set of families based on the values of fields and attributes of the records in a database system. The families are stored and managed in separate tables. The records in data tables are identified as belonging to one or more families. Furthermore, families may be represented in a hierarchical structure. Families may also inherit from each other based on a parent to child relationship also stored in the database. The invention provides means for fast and organized retrieval of sets data from a database. These and other features greatly facilitate automatic and consistent document generation.

2 Claims, 7 Drawing Sheets

METHOD AND APPARATUS FOR STRUCTURING, MAINTAINING, AND USING FAMILIES OF DATA

This non-provisional application takes priority from U.S. Provisional Application No. 60/234,015 filed on Sep. 20, 2000.

BACKGROUND OF THE INVENTION

1. Field of the Invention

This invention relates to the field of computer software. More specifically the invention relates to an improved method and apparatus for structuring, maintaining, and using families of data.

2. Background Art

Many companies use catalogs to convey information about the products they sell. The organization and layout of each catalog that is published is important because the catalog must quickly convey information to the purchaser about the products the company offers for sale. For instance, when publishing the contents of a catalog, product information should be organized into a more detailed arrangement than that provided by the categories of a typical classification scheme. A detailed arrangement groups items according to the category value and other criteria. For example, products in a certain category, such as paintbrushes, may also be grouped by manufacturer. These groupings are referred to as families. Generally speaking, a family can be defined as a group of records, in a table, related by one or more common fields having the same value. These families may also have additional fields of common information, such as of common information, such as images, logos paragraphs of descriptive text, bullets of specifications, and other data. Families provide a way of identifying groupings by fixing one or more common fields and/or attribute values. Existing methods use data structures to store and retrieve these families of records. However, these methods present several problems with defining structures. To educate the reader, a brief description of some of the problems with arranging records in families follows.

For illustration purposes a brief example of a family will follow. Initially, the data to be illustrated in a catalog (or any other type of data in a database) is represented in a classification scheme called a taxonomy. The taxonomy provides for the partitioning of a table and its records into multiple categories, with or without a hierarchy, along with the assignment of attributes to each of a number of categories. In Table 1, a taxonomy is used where a table and its records are partitioned into categories, with or without a hierarchy, where each category comprises a set of common attributes. A category's attributes may not be physically part of a record but instead can be considered part of the definition of the record, where the record contains a reference to the category's attributes.

The examples that follow will be based on the taxonomy and data displayed in Tables 1–4:

TABLE 1

| Category ID | Category | Parent ID | Position |
|---|---|---|---|
| 1 | Printers | 0 | 0 |
| 2 | Daisy Wheel Printers | 1 | 0 |
| 3 | Dot Matrix Printers | 1 | 1 |
| 4 | Inkjet Printers | 1 | 2 |
| 5 | Laser Printers | 1 | 3 |

TABLE 2

| Attribute ID | Attribute | Type |
|---|---|---|
| 1 | Pages Per Minute (ppm) | Numeric |
| 2 | Color | Text |

TABLE 3

| Attribute ID | Feature ID | Feature |
|---|---|---|
| 2 | 1 | Color |
| 2 | 2 | Black & White |

TABLE 4

| Category ID | Attribute ID |
|---|---|
| 1 | 1 |
| 1 | 2 |

The four tables above define the following taxonomy:

Printers (ppm, color)

Daisy Wheel Printers

Dot Matrix Printers

Inkjet Printers

Laser Printers

The taxonomy provides an example of a category hierarchy with five categories, a root category (a node that has no parent), identified as "Printers", and four remaining child (and leaf node) categories associated with the "Printers" category. The "Printers" category may have two attributes "ppm" and "color".

TABLE 5

PRINTERS:

| ID | Model | Manufacturer | Category ID | Description | Price |
|---|---|---|---|---|---|
| 1 | ALP1 | Acme | 5 | 8 pages per minute. black & white | $ 500 |
| 2 | AIJP1 | Acme | 4 | 3 pages per minute ink, black & white | $ 150 |
| 3 | ALP2 | Acme | 5 | 8 pages per minute; color | $4000 |
| 4 | ADMP1 | Acme | 3 | 3 pages per minute; black & white | $ 100 |
| 5 | BLP1 | Best | 5 | 20 pages per minute, color | $5000 |

TABLE 5-continued

PRINTERS:

| ID | Model | Manufacturer | Category ID | Description | Price |
|---|---|---|---|---|---|
| 6 | BLP2 | Best | 5 | 20 pages per minute, black & white | $1000 |
| 7 | BIJ1 | Best | 4 | 4 pages per minute; color | $ 250 |
| 8 | BDWP1 | Best | 2 | 2 pages per minute, black & white | $ 75 |

The first table (Table 1), or category table, defines categories within the taxonomy. The category table includes a "Parent ID" field that may be used to define a hierarchy and, more particularly, a category's level within a category hierarchy. An attributes table (Table 2) defines attributes that may be included in a category. Table 3, a feature-values table, may be used to define enumerated values of an attribute of the attributes table. In the example, the feature values table identifies two enumerated values for the "color" attribute. Table 4, a category-attribute table, identifies the attributes that are associated with a record of the category category table (Table 1) that defines additional data elements (or attributes) of the referencing record.

Several solutions may be used to partition the data (e.g., in Table 5) into families. A brief description of some of these solutions and the problems associated with them follows.

The "Table Per Family" Approach

The "table per family" approach partitions the records into families by storing the records of each family in its own table (e.g., Tables 6–11).

TABLE 6

| ID | Model | Manufacturer | Category ID | Description | Price |
|---|---|---|---|---|---|
| 1 | ALP1 | Acme | 5 | 8 pages per minute; black & white | $ 500 |
| 3 | ALP2 | Acme | 5 | 8 pages per minute; color | $4000 |

TABLE 7

| ID | Model | Manufacturer | Category ID | Description | Price |
|---|---|---|---|---|---|
| 2 | AIJP1 | Acme | 4 | 3 pages per minute ink; black & white | $150 |

TABLE 8

| ID | Model | Manufacturer | Category ID | Description | Price |
|---|---|---|---|---|---|
| 4 | ADMP1 | Acme | 3 | 3 pages per minute; black & white | $100 |

TABLE 9

| ID | Model | Manufacturer | Category ID | Description | Price |
|---|---|---|---|---|---|
| 5 | BLP1 | Best | 5 | 20 pages per minute; color | $5000 |
| 6 | BLP2 | Best | 5 | 20 pages per minute; black & white | $1000 | table. Inheritance may be used to allow child categories to inherit attributes that are associated with a parent category. The families, in the examples, will be defined by the combination of manufacturer and category. The fifth table (Table 5) shows a list of data entries for printers. The "Position" field identifies a position within a hierarchical level for a given category. Each of the records in a uniform fields table (i.e., Table 5) references a category record in the

TABLE 10

| ID | Model | Manufacturer | Category ID | Description | Price |
|---|---|---|---|---|---|
| 7 | BIJ1 | Best | 4 | 4 pages per minute; color | $250 |

TABLE 11

| ID | Model | Manufacturer | Category ID | Description | Price |
|---|---|---|---|---|---|
| 8 | BDWP1 | Best | 2 | 2 pages per minute; black & white | $75 |

This approach provides for efficient storage of the data. However, as the number of families increases, so does the number of tables. Data management and searching for records then becomes increasingly complex and time-consuming because additional tables must be accessed. Furthermore, changes to the family definition require complex restructuring of the tables and reorganization of the records contained within them. For example, if families were changed to be defined as the combination of the category and the color attribute, then six new tables (Laser/Color, Laser/B&W, Inkjet/Color, Inkjet/B&W, Dot Matrix/B&W, and Daisy Wheel/B&W) would need to be created and populated, and the old tables would have to be destroyed.

The "Table Lookup" Approach

The "table lookup" approach typically requires three steps. First, a table containing a record for each of the families must be created (e.g., Table 12). Second, a lookup field for the family must be added to the partitioning table. Third, the identifier (ID) of the proper family record, in the family table, must be placed into this field for each record of the partitioning table to create a relationship between each record and its corresponding family (e.g., Table 13).

TABLE 12

| Family ID | Description |
| --- | --- |
| 1 | Acme Laser Printers |
| 2 | Acme Inkjet Printers |
| 3 | Acme Dot Matrix Printers |
| 4 | Best Laser Printers |
| 5 | Best Inkjet Printers |
| 6 | Best Daisy Wheel Printers |

TABLE 13

| ID | Model | Manufacturer | Category ID | Description | Price | Family ID |
| --- | --- | --- | --- | --- | --- | --- |
| 1 | ALP1 | Acme | 5 | 8 pages per minute; black & white | $5500 | 1 |
| 2 | AIJP1 | Acme | 4 | 3 pages per minute ink; black & white | $ 150 | 2 |
| 3 | ALP2 | Acme | 5 | 8 pages per minute; color | $4000 | 1 |
| 4 | ADMP1 | Acme | 3 | 3 pages per minute; black & white | $ 100 | 3 |
| 5 | BLP1 | Best | 5 | 20 pages per minute; color | $5000 | 4 |
| 6 | BLP2 | Best | 5 | 20 pages per minute; black & white | $1000 | 4 |
| 7 | BIJ1 | Best | 4 | 4 pages per minute; color | $ 250 | 5 |
| 8 | BDWP1 | Best | 2 | 2 pages per minute; black & white | $ 75 | 6 |

This approach has several major drawbacks. First, the manual process of assigning the family identifiers is time-consuming, error-prone and extremely tedious. Second, changes to the record do not result in the product being properly reassigned to the correct family. Third, changes to the families may require that some or all of the records of the family be reassigned.

The "Stored Query" Approach

Because the related records in a family have the same fixed values for a set of field values, they can be identified by a query specifying these common values. This query can be stored and later referenced to identify and locate the records for the family.

TABLE 19

| Query Name | Query |
| --- | --- |
| Acme Laser Printers | Manufacturer = Acme; Category = Laser Printers |
| Acme Inkjet Printers | Manufacturer = Acme; Category = Inkjet Printers |

TABLE 19-continued

| Query Name | Query |
| --- | --- |
| Acme Dot Matrix Printers | Manufacturer = Acme; Category = Dot Matrix Printers |
| Best Laser Printers | Manufacturer = Best; Category = Laser Printers |
| Best Inkjet Printers | Manufacturer = Best; Category = Inkjet Printers |
| Best Daisy Wheel Printers | Manufacturer = Best; Category = Daisy Wheel Printers |

This approach also has several shortcomings. First, there are a variety of problems setting up and maintaining the queries. Setting up the queries is time-consuming and error-prone, because each must be manually done. Each query must be given a name or identifier so that it can be referenced and, with a large number of families, it quickly becomes difficult to organize and manage the set of family queries. There is no way to guarantee that the set of queries will contain the entire set of records, while also ensuring that each record belongs to exactly one query; that is, some queries may inadvertently overlap so that a single record belongs to multiple families, or the queries may not provide adequate coverage, so that some records may not belong to any family. The relationship between the families is not visually obvious from the queries, nor is there any single structure that identifies, illustrates, or maintains these relationships. Finally, while the queries identify which records belong to the family, they fail to provide an efficient way to determine to which family a particular record belongs. Finding the family for a particular record would require examining each of the queries, one at a time, to see if the record matched the criteria for that query.

Storing Common Information For Family

Another common data storage problem concerns the need of a database to store fields of common information that relate to a family of related records rather than just a single record. The challenge is to store information in a way that is efficient, easy to implement for existing data, and easy to maintain, as additional records are added to the database.

Single Table Approach

Existing solutions use a "Single Table approach" or a "Multiple Table approach". In the "Single Table" approach, all of the data values for a main table record, including the common information that applies to an entire family of records are stored, within the record itself in the single main table. As a result, the table structure is very simple but, at the same time, it is both wasteful of storage because the common data values are duplicated in multiple records, and wasteful of effort because each of the values must be entered manually and repetitively for each of the multiple records in a family. In addition, a change to any of the common data values is not automatically propagated through the entire family of records; rather, the data value must be updated in each of the multiple records that contain the value, introducing the potential for inconsistency and error.

Multi-Table Approach

The "Multi-Table" approach is consistent with the relational data model and uses multiple tables to store related information. The primary table stores the specific information about each main table record while a lookup table contains a record for each family that stores the fields of common information. Records in the tables are linked by placing an identifier in both tables that links each record in the primary table to the corresponding record in the lookup table. The advantage of this approach is that the common data values are stored only once in a single record in the lookup table, eliminating duplication and saving space; additionally, changes to the single copy of the common information are automatically reflected in all the records of a family. The drawback of this approach is that the link between each record in the primary table and corresponding record in the lookup table still needs to be defined manually; similarly, new records that are added to the database must be manually linked to the common information by the user rather than automatically linked by the system. In addition, if there are many different fields of common information, but only some of them are used for each family, the columns that store the information will be sparse.

Publishing

A third aspect related to data storage and retrieval relates to publishing catalogs of product information in paper and electronic media. Publishing catalogs of product information in paper and electronic media historically has been two very different and distinct processes, with a very different level and type of effort involved, and very different standards and expectations for quality. The challenge is to eliminate the distinctions between paper and electronic output and combine the best of both media in a way that brings to electronic catalogs the structure and high standard of quality typical of paper catalogs and, at the same time, dramatically reduces the cost of laying out paper catalogs by flexibly, programmatically, and automatically generating page layouts in real time.

Known solutions present several shortcomings. Paper catalogs are meticulously laid out, with existing page layout programs, a page at a time. Tables are formatted individually by manually populating page layouts with product data, a process that is time-consuming, tedious and very, very expensive. There is also no simple way to experiment with different tabular layout formats and views of the data. Once a page has been laid out, it is difficult to add or remove records from tables without destroying the structure of the page and requiring that it be laid out again (sometimes from scratch), which discourages updates with the result that catalog pages tend to quickly become out-of-date. The upside of this complex process, however, is that manual page layout usually results in high page density, flexible and well-structured tabular layout formats using pivots to eliminate redundant information, and a very high overall standard of quality. Notwithstanding the high level of quality, however, it remains difficult to enforce a uniform look throughout a publication because more than one person is usually involved in the page layout process, and each lays out pages somewhat differently.

By contrast, electronic catalog pages are typically database-driven and generated programmatically in real-time. Since page layouts do not actually exist until the electronic catalog page is displayed, new products can be added and old products removed without disturbing the system or the published output. Unfortunately, the downside of this flexibility is that automatically generated electronic catalog pages are usually no more than wide, ugly, "spreadsheet-style" tables of data with redundant information, very little structure, and none of the sophisticated tabular layout formats that are standard for paper pages. With category-specific attributes and a large number of categories, it is even more impractical to have a customized hand-coded display for each family, so generic unstructured presentations are even more the norm.

Moreover, when publishing to multiple media, none of the effort invested in meticulously laying out paper pages can be leveraged for the electronic catalog, since both the structure of the tabular layout formats as well as the product data are typically trapped within the page layout itself, while the electronic catalog requires that the data be stored and managed in a database to be searchable and generated in real-time. Thus the worlds of the two media are completely distinct and non-overlapping, very difficult to integrate, and require two distinct publishing efforts.

SUMMARY OF THE INVENTION

The invention is a method and apparatus for structuring, maintaining, and using families of data. Each family of data represents a group of records in a database table. Records in the group of records are related by one or more common field values. In an embodiment of the invention, the fields and attributes are combined to construct family items. Each family item is stored in a family table (or partitioning table). A family item refers to one field value item or to a combination of field values. Each family possesses a description and is characterized by the values of the fields it comprises. Fields used to construct families possess relationships with each other. Using these relationships, one is able to link field values in a hierarchy. A hierarchy can be defined when a group of records (having a set of field values) comprises all the characteristics of a second group of records, and further comprises one or more extra field values. In this vase, the first group is called the parent family and the second one is called the child family. Thus, with more than 2 fields one may build a hierarchical tree comprising multiple levels of inheritance. An embodiment of the invention uses the fields to generate taxonomy, where each family is identified through a combination of a unique set of field values.

An embodiment of the invention uses family identifiers to label each record in the family table with a unique identifier. The identifiers are also used to populate a field, in the table, reserved for holding the identifier of the parent family, thus allowing for traversing hierarchical trees in both ascending and descending orders. Embodiments of the invention partition the records of a table according to the set of families constructed. Partitioning the table records may be performed by setting the value of a field in the family table, reserved for the purpose, to the value of the family to which the record in the main data table belongs.

The invention offers means to manage and update family structures. For example, embodiments of the invention may reconstruct the family structure upon insertion or deletion of one or more records in the database partition table.

By partitioning the records and storing the family information in a separate table, the invention offers methods to enhance data retrieval, and allows for dynamically changing the data structure for database output. An embodiment, of the invention provides means for storing formatting data along with the data in the database. In this case, database driven document generation depends more on the formatting stored in the database and less on the rendering programs that generate the documents.

DETAILED DESCRIPTION OF THE INVENTION

An embodiment of the invention comprises a method and apparatus for structuring, maintaining, and using families of data. In the following description, numerous specific details are set forth to provide a more thorough description of embodiments of the invention. It will be apparent, however, to one skilled in the art, that the invention may be practiced without these specific details. In other instances, well known features have not been described in detail so as not to obscure the invention. A description of some relevant database terminology can be found in Section A.

Structuring and Creating Partitioning Families

Each family of data represents a group of records in a database table that are related by one or more common field having the same value, and that may also have additional fields of common information (e.g., images, logos paragraphs of descriptive text, bullets of specifications and other data). Families are used to indirectly partition the records in a database. A partition is the division of a group of records into one or more subgroups, each of which is defined by a set of records from that group that have a fixed set of values for one or more field values. The partition is specified by the set of fields whose values or value combinations will define the subgroups. Each field can include category specific attributes. The main table of records that is to be divided into partitions is divided according to a partitioning table, e.g., the family table.

To generate a family structure in an existing database, the existing taxonomy (e.g., classification structure) in a database is assumed. Further information about family structures can be found in patent application entitled "DATA INDEXING USING BIT VECTORS", U.S. Ser. No. 09/643,207, which is incorporated herein by reference. The taxonomy represents the partitioning of a table into multiple categories, with or without a hierarchical structure, along with the assignment of attributes to each category. A category is a subset of the records of a table that has a set of common field values or combination thereof. Each record in a table belongs to exactly one category.

Embodiments of the invention take advantage of the fact that each family is defined by fixing a set of common values for one or more fields.

Figure 1:
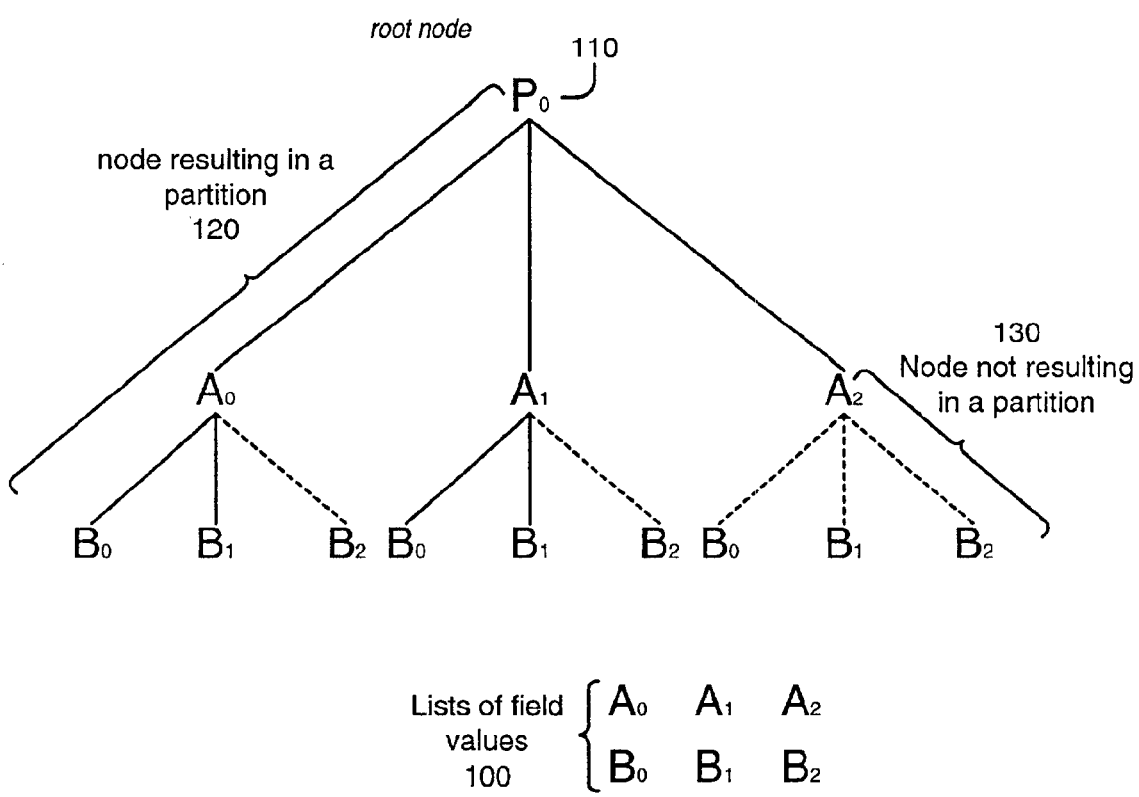
FIG. 1 is a diagram illustrating how lists of field values can be arranged in a hierarchical structure to build partitioning families in an embodiment of the invention.

In an embodiment of the invention, families are organized into a partitioning hierarchy. FIG. 1 is a diagram illustrating how lists of field values can be arranged in a hierarchical structure to build partitioning families in an embodiment of the invention. In FIG. 1, $P_0$ 110 is the root node in the tree. $P_0$ 110 may for example be a field describing a set of records in the database. In the example provided above, all printers possess a "Printer" designation. The designation "Printer" is used as a root in a hierarchy of families to specify that all products contained in the hierarchy must be printers.

In an embodiment of the invention, the list of field values 100 (e.g. $\{A_1, A_2, A_3\}$ and $\{B_0, B_1, B_2\}$) are selected by a user, or automatically generated using the data records present in the database. The lists of field values are used to build families in a hierarchy. Each field value may be a node in the hierarchy tree. In the example provided above, Color, Laserjet and Printer are descriptions of a product combined to build the family of "Color laserjet printer". Another example of a family is "Color inkjet printer". Each path of the hierarchy tree may be used as an entry in a family table that is also referred as the partitioning table of the partitioning hierarchy. A partitioning hierarchy of a partitioning table is a hierarchy in which the nodes of the hierarchy represent partitions of the partitioning table. In FIG. 1, the path 120 is typically a family in the partitioning hierarchy. In addition some tree paths are also considered partitioning nodes (e.g. 130) because of the lack of records matching the family specification. In the example provided above, if no manufacturer in the database makes a network dot matrix printer, then the partitioning hierarchy may not include a "network dot matrix printer" family. Therefore, a partitioning node is a node in the partitioning hierarchy that corresponds to a particular family of records. Since a partition simply divides a group of records into sub-groups, the set of records represented by a partitioning node is exactly the set of records represented by combining the sets of records represented by each of the descendants of that partitioning node. The root partitioning node (or root partition) represents the entire set of records of the partitioning table; each sub-node represents only those records which have a fixed set of field values defined by the partitions, starting at that sub-node and tracing ancestors back up to the root. The entire set of leaf partitioning nodes (or leaf partitions) represents the entire set of records and each record of the partitioning table belongs to one and only one leaf partitioning node. In what follows, a base family will refer to a family that corresponds to a leaf partitioning node. Also, the base family set will refer to the complete set of base families that corresponds to the complete set of leaf partitions in a partitioning hierarchy. The base family set is useful because each record of the partitioning table belongs to exactly one base family.

Figure 2:
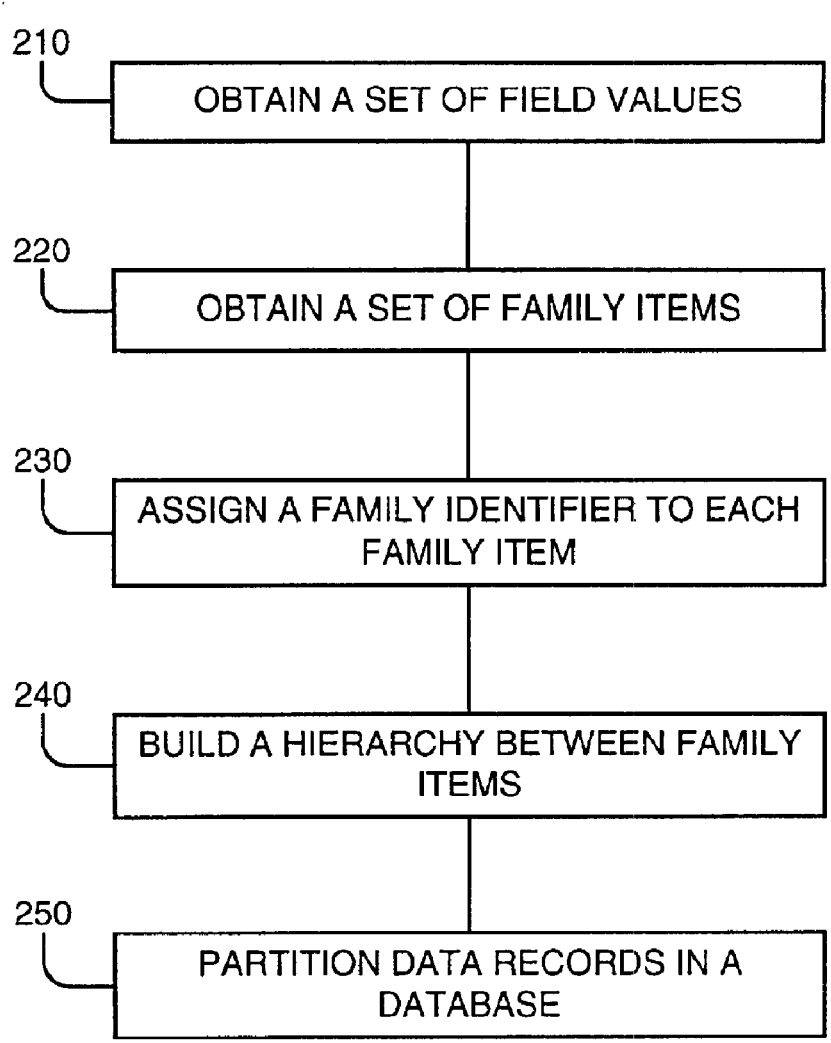
FIG. 2 shows a flowchart diagram illustrating the overall steps involved the method of building the family-based partitions in an embodiment of the invention.

FIG. 2 shows a flowchart diagram illustrating the overall steps involved the method of building the family-based partitions in an embodiment of the invention. In step 210, one or more sets of field values are collected. This process may involve user intervention through a user interface (see below, in the example of implementation), an automatic process for determining a set (or sets) of field values or categories (see below, in the example of maintaining family-based partitioning), or a combination of both user input and an automatic process. In an embodiment of the invention, in step 220, the set (or sets) of field values and categories are used to specify product families. Since a category and field-based taxonomy already exists, it would be beneficial to layer the partitioning hierarchy on top of it, so as to leverage the work already done to create the taxonomy. This can be accomplished by using the category field to define the first partition (e.g. $P_0$ in FIG. 1) in the partitioning hierarchy. At first this might appear to be the same as the Taxonomy approach presented above. The difference lies in the fact that the partitioning hierarchy is layered on top of the existing taxonomy, rather than incorporating the family information directly into the taxonomy. The steps involved in building a set of family items further described in FIG. 3.

In an embodiment of the invention, each family item in a set of family items is associated with an identifier (e.g. step 230). The identifier allows subsequent location of the family item in the partitioning table, and use of the inheritance tree in the hierarchical partitioning. In step 240, inheritance relationships are defined and implemented. For example, an embodiment of the invention uses a descriptor (e.g. a field in a database table) to hold the identifier of the parent in the hierarchy. In step 250, partitions are built using each valid path in the partitioning tree.

Figure 3:
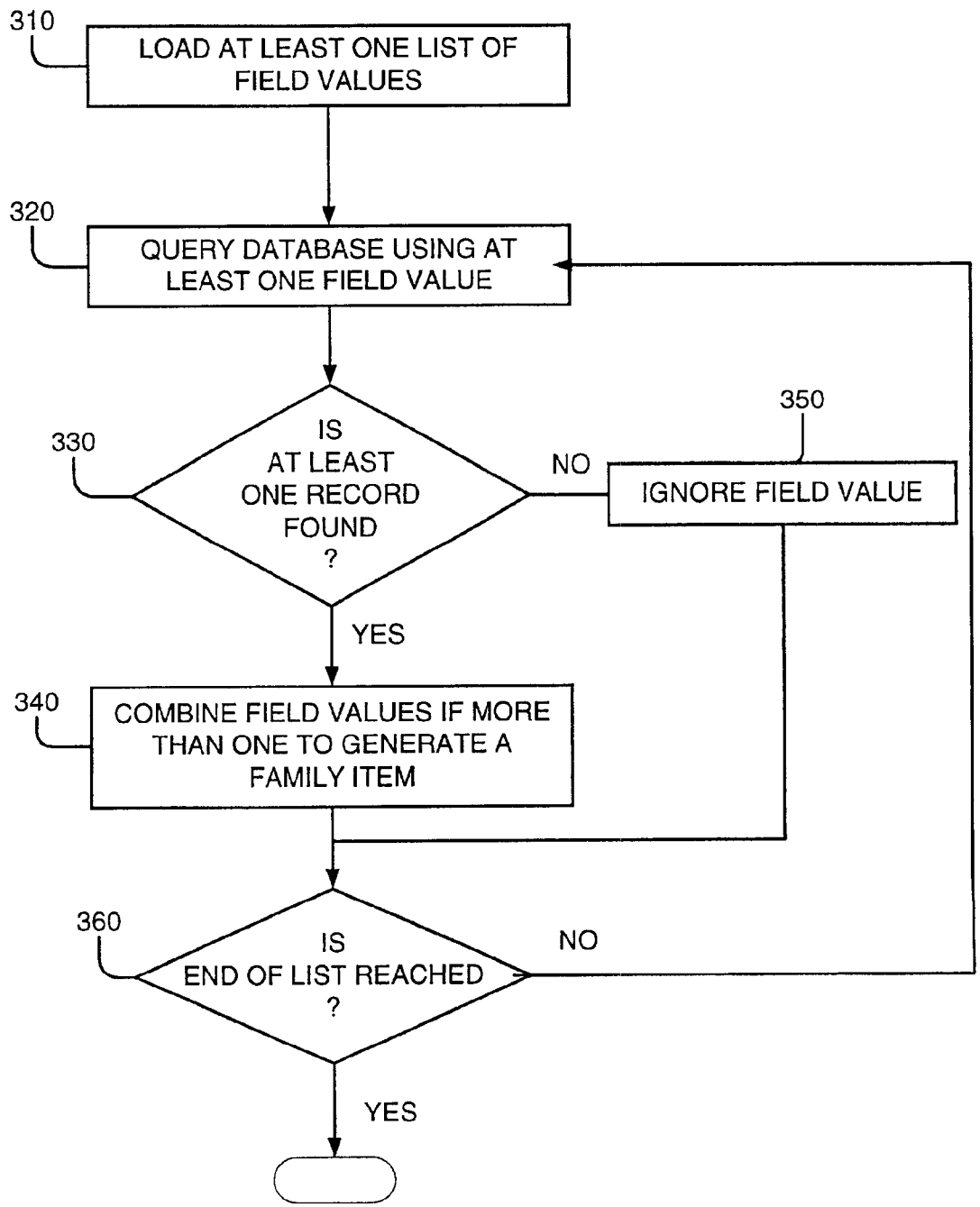
FIG. 3 shows a flowchart illustrating the steps involved in obtaining family items from one or more sets of field values in an embodiment of the invention.

FIG. 3 shows a flowchart illustrating the steps involved in obtaining family items from one or more sets of field values in an embodiment of the invention. In step 310 one or more sets, containing one or more field values, are loaded through a user interface, or through a process for automatically selecting field values. In an embodiment of the invention, each combination of field values is used to form a database query. In step 320, the query is submitted to the database. The test in step 330 indicates whether a combination of field values have any associated records in the database as a result of the query. If the query points to existing records in the database, the combination of field values is retained and processed to produce a family item in step 340. Otherwise the field values are ignored in step 350. In step 360 a search is performed to check whether all field values in the sets of fields were processed. The processing continues until all field values in the set are processed. In the case of a hierarchical relationship, this is equivalent to traversing all the possible paths in the hierarchy tree.

Figure 4:
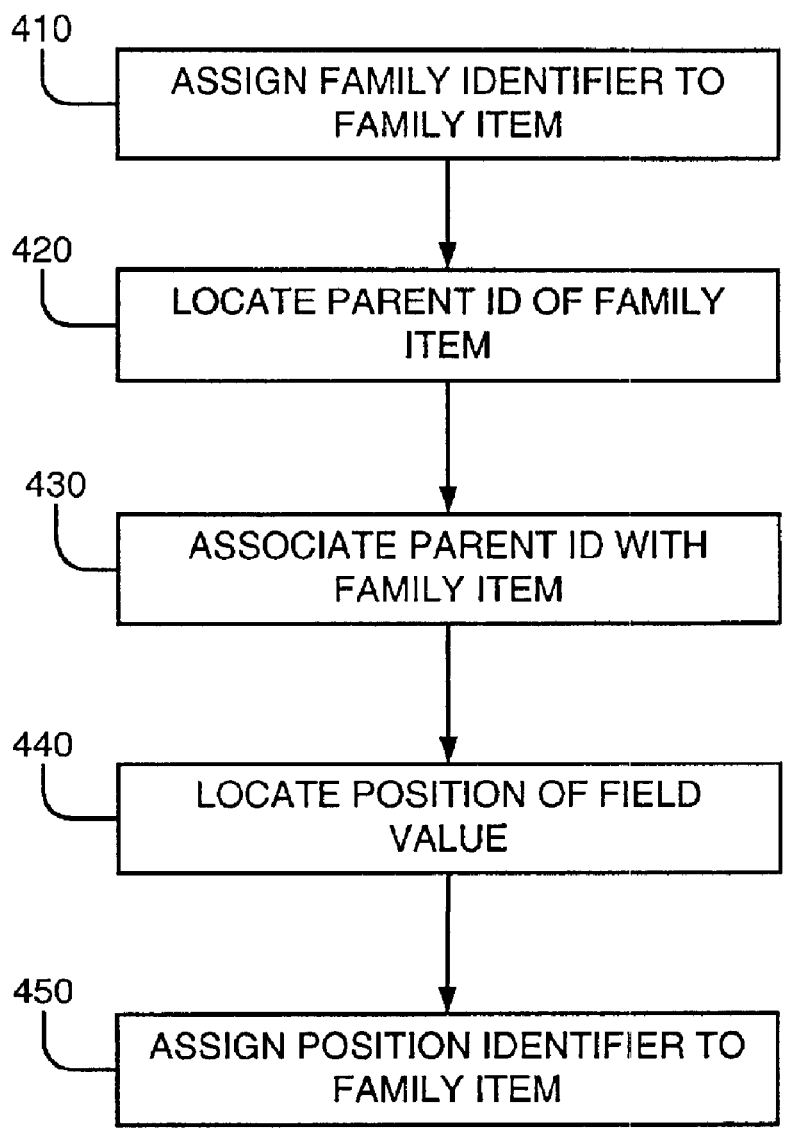
FIG. 4 shows a flowchart illustrating the steps involved in building a hierarchy between family items in an embodiment of the invention.

FIG. 4 shows a flowchart illustrating the steps involved in building a hierarchy between family items in an embodiment of the invention. In step 410 each family item is assigned an identifier (see above). In step 420, for each node, the identifier of the parent of the node is determined. The parent node identifier is associated with the node in step 430, for example, by entering the identifier of the parent in the Parent ID field corresponding to the record of the node. In step 440 a position of the field value in the set of field values is provided. The family item is then associated with the position in step 450.

In an embodiment of the invention, the partitioning hierarchy is stored as a hierarchical structure. An additional table is used to store the fixed field values that define the partitions.

In the example provided below, the table contains fields that provide information on the identifier of the partitioning node, the field value that is being partitioned, and positional information to allow for combining and nesting partitions. Rather than storing the partitioning information directly as part of the hierarchy table, an additional table is used because there may be multiple fields that define a partition. For example, a partition could be defined based on the combination of a field (such as the manufacturer) and an attribute (such as color).

TABLE 20

| Family ID | Family | Parent ID | Position |
|---|---|---|---|
| 1 | Printers | 0 | 0 |
| 2 | Daisy Wheel Printers | 1 | 0 |
| 3 | Best Daisy Wheel Printers | 2 | 0 |
| 4 | Dot Matrix Printers | 1 | 1 |
| 5 | Acme Dot Matrix Printers | 4 | 0 |
| 6 | Inkjet Printers | 1 | 2 |
| 7 | Acme Inkjet Printers | 6 | 0 |
| 8 | Best Inkjet Printers | 6 | 1 |
| 9 | Laser Printers | 1 | 3 |
| 10 | Acme Laser Printers | 9 | 0 |
| 11 | Best Laser Printers | 9 | 1 |

TABLE 21

| Family ID | Field |
|---|---|
| 1 | Manufacturer |

Table 20 defines the following family partitioning hierarchy:
Printers (ppm, color)
    Daisy Wheel Printers
        Best Daisy Wheel Printers
    Dot Matrix Printers
        Acme Dot Matrix Printers
    Inkjet Printers
        Acme Inkjet Printers
        Best Inkjet Printers
    Laser Printers
        Acme Laser Printers
        Best Laser Printers Table 21 shows an additional partition layered on the top of the previous taxonomy describing using the manufacturer field.

In this example, notice that the family partitioning hierarchy has the same initial structure of the taxonomy, but additional nodes are added to it. These nodes are created because a partitioning exists at the Printers node that is defined to partition according to manufacturer. This causes all leaf nodes under this node to be further partitioned by manufacturer. The initial leaf nodes were Daisy Wheel Printers, Dot Matrix Printers, Inkjet Printers, and Laser Printers. Under each of these, additional nodes will be added for each manufacturer that has products defined by the query constructed by taking all of the criteria defined by the ancestor nodes in the family partitioning hierarchy. Since this is the first partition, the criteria are simply the category for each of the initial leaf nodes. Notice that a node is not added for all manufacturers, only those that correspond to actual records in the database.

Whenever a new category is added to or removed from the taxonomy, the corresponding portion of the family partitioning hierarchy must also be adjusted in the same manner. This is an important constraint on this approach and will result in a change of base families.

This idea can be extended to reflect changes in the possible values for other fields in the family partitioning hierarchy. Thus, when a value is added/removed from the set of possible values for a particular partition, the corresponding node will be added/removed from the family partitioning hierarchy. This is illustrated below where, in addition to partitioning on the category (the initial taxonomy) and manufacturer (the additional nodes added to account for the manufacturer), a partition by Color is also performed on the Laser Printers node.

TABLE 22

| Family ID | Family | Parent ID | Position |
|---|---|---|---|
| 1 | Printers | 0 | 0 |
| 2 | Daisy Wheel Printers | 1 | 0 |
| 3 | Best Daisy Wheel Printers | 2 | 0 |
| 4 | Dot Matrix Printers | 1 | 1 |
| 5 | Acme Dot Matrix Printers | 4 | 0 |
| 6 | Inkjet Printers | 1 | 2 |
| 7 | Acme Inkjet Printers | 6 | 0 |
| 8 | Best Inkjet Printers | 6 | 1 |
| 9 | Laser Printers | 1 | 3 |
| 10 | Acme Laser Printers | 9 | 0 |
| 11 | Best Laser Printers | 9 | 1 |
| 12 | Color Acme Laser Printers | 10 | 0 |
| 13 | B&W Acme Laser Printers | 10 | 1 |
| 14 | Color Best Laser Printers | 11 | 0 |
| 15 | B&W Best Laser Printers | 11 | 1 |

TABLE 23

| Family ID | Field |
|---|---|
| 1 | Manufacturer |
| 9 | Manufacturer |
| 9 | Color |

Table 22 defines the following family partitioning hierarchy:
Printers
  Daisy Wheel Printers
    Best Daisy Wheel Printers
  Dot Matrix Printers
    Acme Dot Matrix Printers
  Inkjet Printers
    Acme Inkjet Printers
    Best Inkjet Printers
  Laser Printers
    Acme Laser Printers
      Color Acme Laser Printers
      B&W Acme Laser Printers
    Best Laser Printers
      Color Best Laser Printers
      B&W Best Laser Printers In this example, notice that partitioning information for Color has been added to the Laser Printers node, and that only descendants of that node are affected (see Table 23). Also, notice that a second occurrence of a manufacturer partition has been added. The reason is that descendant nodes inherit partition information. In other words, all descendant nodes of a particular "ancestor" node are automatically assigned the same partition information that is assigned to the ancestor, which makes setting up and maintaining partitions much more efficient. However, if there were no way to override the partition settings of an ancestor node, inheritance would always affect all descendant nodes. To get around this problem, inheritance does not affect a node that has any partitions defined nor does it affect any of its descendants; rather the descendants inherit the override partition settings. In order to obtain the partition defined for an ancestor as well as a custom partition, a node must define both partitions. If the second occurrence of the manufacturer partition had not been added, then the family partitioning hierarchy would be as follows:

TABLE 24

| Family ID | Family | Parent ID | Position |
|---|---|---|---|
| 1 | Printers | 0 | 0 |
| 2 | Daisy Wheel Printers | 1 | 0 |
| 3 | Best Daisy Wheel Printers | 2 | 0 |
| 4 | Dot Matrix Printers | 1 | 1 |
| 5 | Acme Dot Matrix Printers | 4 | 0 |
| 6 | Inkjet Printers | 1 | 2 |
| 7 | Acme Inkjet Printers | 6 | 0 |
| 8 | Best Inkjet Printers | 6 | 1 |
| 9 | Laser Printers | 1 | 3 |
| 10 | Color Laser Printers | 9 | 0 |
| 11 | B & W Laser Printers | 9 | 1 |

TABLE 25

| Family ID | Field |
|---|---|
| 1 | Manufacturer |
| 9 | Color |

Table 24 defines the following family partitioning hierarchy:
Printers
  Daisy Wheel Printers
    Best Daisy Wheel Printers
  Dot Matrix Printers
    Acme Dot Matrix Printers
  Inkjet Printers
    Acme Inkjet Printers
    Best Inkjet Printers
  Laser Printers
    Color Laser Printers
    B&W Laser Printers Table 25 shows, in addition to the manufacturer partitions from the previous example, a third partition (Color).

In this example, there is also a difference based on the ordering of the partitions. Had the Manufacturer Name partition been added after the Color partition, then the result would be as above with two nodes added under each of the Color Laser Printers and B&W Laser Printers nodes for the Acme and Best manufacturers.

Partitioning by multi-valued fields is given special treatment to ensure that a record belongs to exactly one family. The combination of values is treated as a distinct unit when determining the unique set of values for the field. For example, if there was a partition on a multi-valued field of color and one of the records had Blue/Green as the value for that field, then the record would be placed in the Blue/Green family, and not in the Blue family or Green family.

In an embodiment of the invention, in order to find the records that belong to a particular family, a query can be constructed by setting constraints for each value from the fixed set of common values for that family. Executing that query will locate a set of records that belong to that family.

Since the partitioning hierarchy is organized so that each branch, from a node to its sub-nodes, differ in the value or value combination on which the node is partitioned, each of the leaf partitioning nodes will differ by at least one value or value combination. Thus the queries constructed for each of the base families will also differ by at least one constraint. The result is that each query is guaranteed to return a non-overlapping set of records.

The linkage between families and records is accomplished automatically by constructing queries with the appropriate constraints for that family, as opposed to the manual process of linking each record to the proper family. As an added benefit, when new records are added or existing records are modified, they will belong to the proper family automatically. Also, if the partitioning hierarchy is restructured so that family definitions change, each record of the partitioning table will automatically belong to its proper family.

Figure 6:
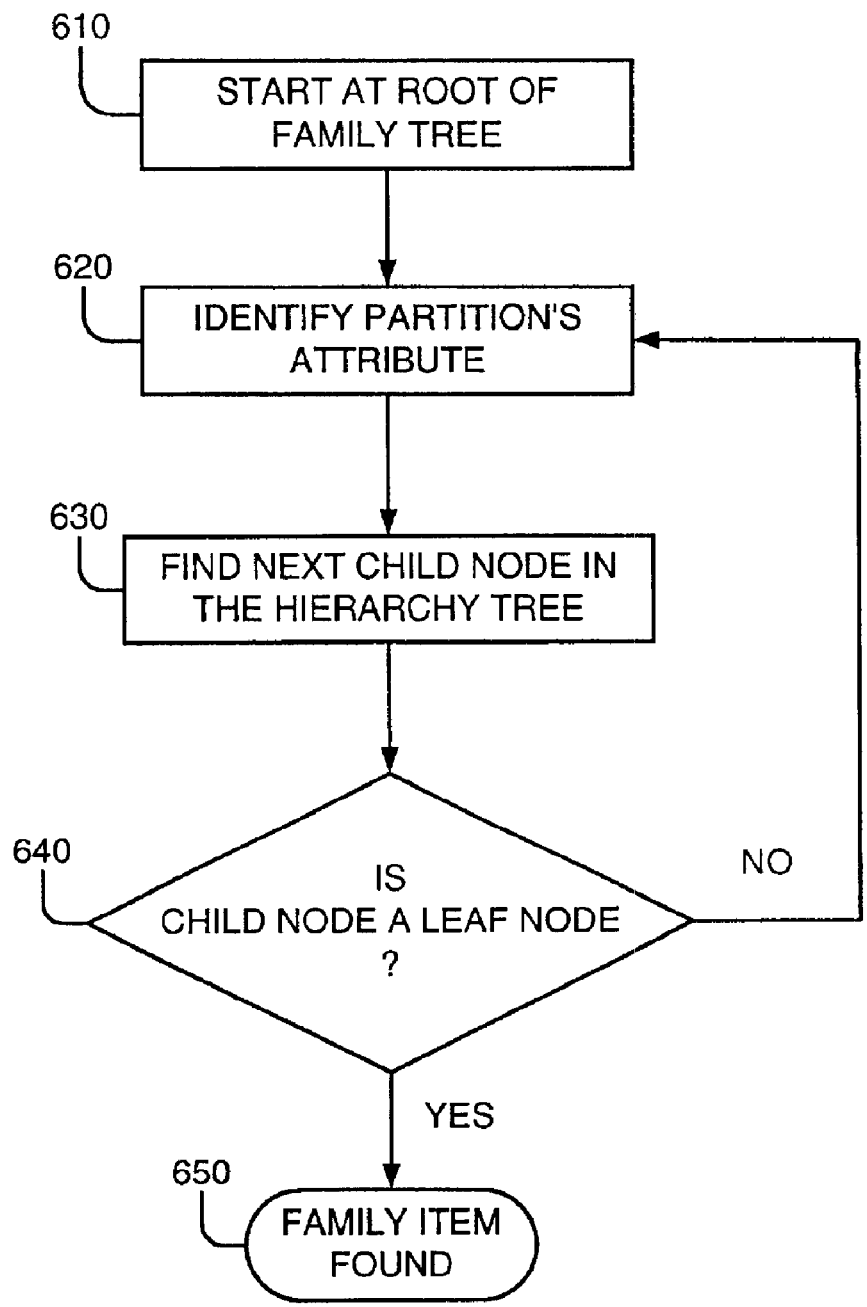
FIG. 6 shows a flowchart illustrating the steps involved in obtaining a family item from a record in the partitioning table in an embodiment of the invention.

There are several advantages provided by embodiments of the method described above. Databases implementing the method provide support for partitioning based on product families and the product families hierarchy. Embodiments of the invention provide for efficient storage for families allowing products to be found from families, and, conversely, families to be found from products. The layering of partitioning hierarchy on top of a category based taxonomy leverages existing taxonomies. Embodiments of the invention provide a method for automatically creating new families as the set of actual field values is changed. Embodiments of the invention provide for ensuring that product records automatically belong to the proper family, even as new records are added and existing records are modified. The method provides for the ability to partition at any level in the partitioning hierarchy, so that different nodes within a single partition can be partitioned differently. Other embodiments of the invention implement inheritance and the overriding of the inheritance of partition information in the partitioning hierarchy FIG. 6 shows a flowchart illustrating the steps involved in obtaining a family item from a record in the partitioning table in an embodiment of the invention. To build a family item a process starts at the root node of the family tree in step 610, and identifies the partition field value in step 620. The process continues fetching child nodes using the value of partition field value in step 630. A relevant child node should have a value equal to the partition field value in the record. The process checks that the node is a leaf node in 640. If the node is a leaf node (i.e. has no child nodes), the result of the combination of field values is the family item. The search is finished in step 650. Otherwise, the process continues searching for child nodes by traversing the partitioning tree.

Figure 7:
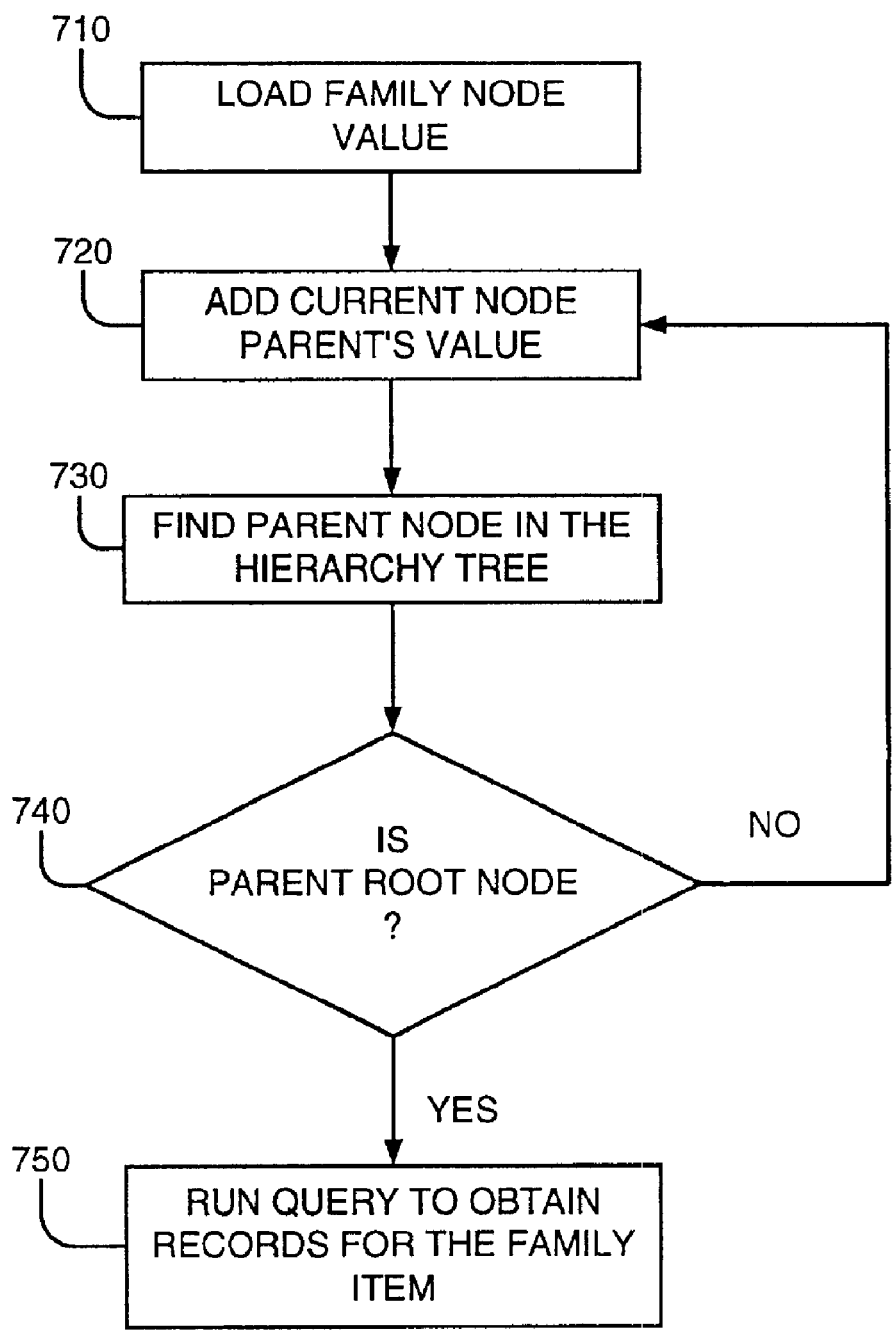
FIG. 7 shows a flowchart illustrating the steps involved in obtaining all the records for a given family item in an embodiment of the invention.

FIG. 7 shows a flowchart illustrating the steps involved in obtaining all the records for a given family item in an embodiment of the invention. The process of obtaining records in a family involves two major steps: 1) building a list of constraints and 2) running a query with those constraints against a database. In an embodiment of the invention, a list of constraints is built starting with the loading of the family node in step 710. The node's parent is fetched, and the value of the partition field value by which the parent node is partitioned is added to the constraint list in step 720. The search continues by traversing the tree, searching for each current node's parent in step 730. The root node is found by checking each current node tested in step 740. When the root node is found, a query comprising the list of constraints is ran against the database in step 750. The result of such a query returns the records that are part of the family for which the search started.

Maintaining Product Families

After the family partitioning hierarchy has been created, it must be maintained when there are changes to the taxonomy structure or to the domain of fields values used for partitioning. Changes to the taxonomy structure that require updates to the partitioning hierarchy include adding, removing, moving, and modifying a category. Changes to the domain of a partitioning field include adding, removing and modifying a field value, while changes to the feature domain for a partitioning attribute include adding, removing and modifying a feature value.

A second problem arises as a result of an optimization that avoids creating a family partitioning hierarchy that contains a high percentage of families with no records. In the previous section, we had assumed that the set of possible values and value combinations and the set of actual values and value combinations in existing main table records were identical. The optimization recognizes that this is not likely to be the case, and that in fact, the number of actual values and value combinations will be substantially less than the number of possible values and value combinations.

Note that using the set of possible values and value combinations when creating families causes the partitioning hierarchy to become unnecessarily large because it will contain many families that contain no records. To illustrate this point, consider a catalog with 200 categories, 500 manufacturers, and 10,000 products. If category were to be partitioned by manufacturer, the "cross-product" approach of using the possible value combinations would create 100,000 families in the partitioning hierarchy, even though the main table contains only 10,000 product records! Most of these families would in fact contain no records, since for a particular category, only a small subset of manufacturers offers products (and conversely, each manufacturer offers just a small number of categories of products).

By contrast, using only the set of actual value combinations that occur in the main table records reduces the number of families dramatically to precisely those containing records (and certainly no more than the number of products in the main table) and results in a much more compact partitioning hierarchy. A consequence of this optimization, however, is that the partitioning hierarchy must now be maintained not only across changes to the taxonomy structure and domains of partitioning field values, but also across changes to main table records. These changes include adding, removing, or modifying main table records.

Embodiments of the invention provide a solution to automatically adjust the partitioning hierarchy when the taxonomy structure, the domain of a partitioning field, or the main table records are modified.

Since the partitioning hierarchy is layered on top of the taxonomy, changes to the structure of the taxonomy hierarchy require updates to the partitioning hierarchy. In particular, nodes that are added, removed, modified, or moved in the taxonomy must be similarly added, removed, modified, or moved in the partitioning hierarchy. In addition, many of the advanced features for in-place schema and data manipulation such as splitting and merging fields can also require updates to the partitioning hierarchy.

Since the partitioning hierarchy depends on the existence of values in actual product records, changes to the main table records may require updates to the partitioning hierarchy. When records are added to the main table, new families must be created if the records contain a value not yet used in any of the fields that are used in defining the family partitions. Similarly, if a record is deleted from the main table and that record is the only record in the main table to contain a particular value for one of the family partitioning fields, the corresponding partitioning node must be removed. Modification of a main table record can have effects similar to those of adding a new record or deleting an existing one since a new value assigned to a field or record could be a value not yet used in one of the family partitioning fields and the value replaced could have been the only occurrence of a particular value in the family partitioning field value. The merging field values in the taxonomy has the same effect as modifying the main table records by replacing the original filed values with the merged field value and can require updates to the partitioning hierarchy.

Note that updates to the partitioning hierarchy to reflect changes to the domain of a partitioning field are automatically handled through the handling of changes to the main table records. This is because changes to a domain no longer affect the partitioning hierarchy unless the added, removed or modified value is actually in use in the main table records.

Figure 5:
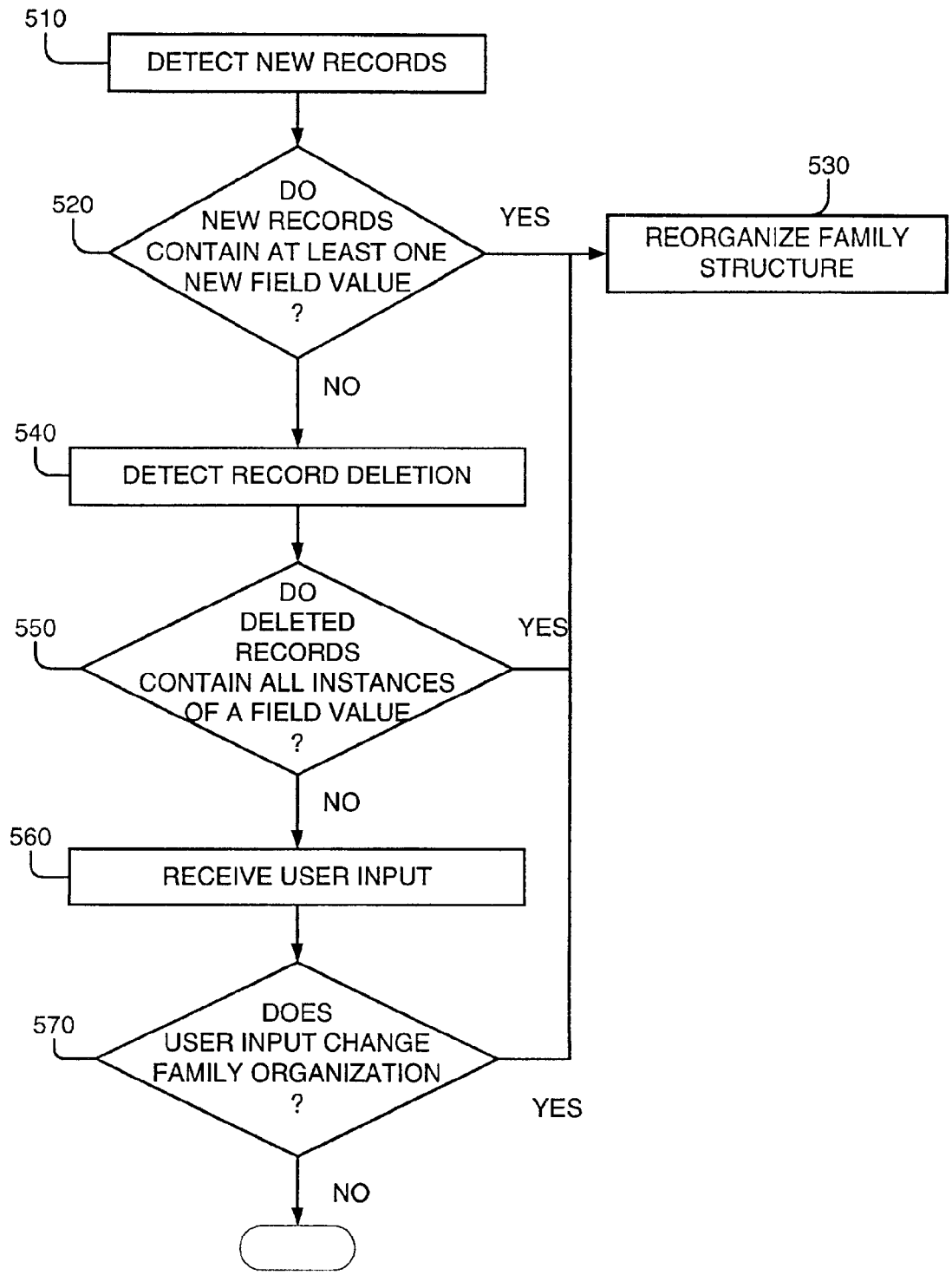
FIG. 5 shows a flowchart illustrating the steps involved in automatically updating the family partitioning in an embodiment of the invention.

FIG. 5 shows a flowchart illustrating the steps involved in automatically updating the family partitioning in an embodiment of the invention. In step 510, new records are detected (e.g. receiving a data insertion query in by the database, or upon an alteration of existing records). Records are checked in step 520 to test whether a new field value is introduced. If a new field value (relevant to the family partitioning) is detected, the family partitioning is reorganized in step 530. The method provides a mechanism for automatically maintaining product families and the partitioning hierarchy. For example, the method provides a mechanism for detecting when the partitioning hierarchy needs to be updated due to modifications of the taxonomy or main table records. Partitioning nodes may be created based on the actual set of values and value combinations used in main table records rather than the possible set of values and value combinations. The method also provides way to detect if a field value disappears (e.g., upon a deletion of records or alteration of the records in the database). The method provides a way to check whether a field value was deleted from the database in step 550. If such event occurs, family partitioning is reorganized to optimize the family partitioning. An embodiment of the invention checks user input instructions to modify the family partitioning in step 570. If a user inputs data to modify the family partitioning the latter is reorganized to optimize family partitioning.

Maintaining Common Information for Families

An embodiment of the invention provides an improved solution for storing data, allowing maintenance of all the benefits of the multi-table approach, while eliminating the need for a lookup field in the primary table whose value identifies the identifier of the corresponding record in the lookup table. This method simultaneously eliminates the need for the user to manually place the identifier of the lookup record into this lookup field in each primary table record. Instead, the improved solution layers on top of the family partitioning hierarchy in such a way that the system creates and maintains all of the relationships automatically based on the membership of each group of primary table records in each family in the family hierarchy.

In an embodiment of the invention, after partitions have been defined by the user and the family partitioning hierarchy has been generated by the system, the user assigns the common information for each family to the families corresponding to leaf nodes of the family hierarchy in the next step. Under this scheme, records in the primary table have already been grouped together into families and common information is then easily assigned to each family. Each new record in the primary table is then automatically linked to the correct common information by virtue of its membership in the proper family. Moreover, for efficiency in storage, rather than store the data values in a fixed set of fields that exist for every family record, the data values are stored in a related, secondary table only on an as-needed basis so that, like attributes, they only take up space if they exist.

Embodiments of the invention provide for means to easily link common information to families and link common information to each family rather than to the main table records by utilizing the family partitioning hierarchy. Other embodiments include automatically creating and maintaining all of the relationships between existing and new main table records and common information based on family membership.

Media-Independent Publishing

Embodiments of the invention provide a solution to improve media publishing. An embodiment of the invention provides a method for a layer on top of the structure to automatically format and publish data from a database. All of the layout formats that are typically stored in the page layout are captured and stored in the database alongside the product data itself. In this scheme, the searchable, database-driven electronic catalog can not only serve up the product data but also the formatting data. The method allows for rendering in real-time by a report writer (such as ASP-generated HTML). The rendering is done independently of data types, even in a catalog with many categories and category-specific attributes. The report writer code itself (or HTML) need only handle the preprocessed pivot tables and requires no complex code for pivoting tabular layout formats, no special coding for each category or family, and no intelligence about the underlying data. More information about pivot tables can be found in co-pending patent application entitled "METHOD AND APPARATUS FOR DYNAMICALLY FORMATTING AND DISPLAYING TABULAR DATA IN REAL TIME", filed on Sep. 20, 2001, Ser. No. to be assigned, which is incorporated herein by reference. Using the structure described in the previous section, electronic catalogs for the first time can now have the density and layout quality of paper catalog pages while maintaining their database-driven search ability.

Embodiments of the invention provide improved solutions for publishing database content that substantially eliminate the manual process of page layout for publishing paper catalogs. For example, the time and effort invested on defining the appropriate tabular layout formats are substantially reduced, since the tabular layout formats are set only once and do not have to be repeated for each family to publish catalogs. As opposed to existing methods that require users to manually populate page layouts with product data, the invention provides solutions that automatically generate page layouts by combining product data and formatting data from the database. Embodiments of the invention use the API of the page layout program (e.g., for programs such as QuarkXPress or Adobe InDesign), or an intermediate ASCII file format (for programs such as Xyvision XPP) to render pages automatically. The invention provides solutions that result in many ways in reducing the publishing cost. For example, embodiments of the invention allow changes to the product data to be reflected immediately in subsequently generated output. Embodiments of the invention support the on-demand generation of custom catalogs on product subsets with no additional effort. Other embodiments of the invention produce a more uniform look throughout the publication, since every page is generated dynamically and automatically by the system.

In an embodiment of the invention, each paper publication starts out as a snapshot of the family partitioning hierarchy and its associated formatting information. Any of the formatting specifications, defined and stored in the family partitioning hierarchy and used for electronic catalog publishing, can be changed in any way for each paper publication. This provides almost unlimited flexibility to create custom paper catalogs, each of which is based upon the electronic standard but is laid out in a fashion that is as similar to, or as different from, any other catalog as necessary. In addition, the system offers the following per-publication flexibility:

A product mask can be applied when the snapshot is taken to limit the set of products appearing in the paper publication, so that each publication can have a different, custom subset of the entire product set (masks can also be applied electronically, and/or search parameters specified, to limit the set of products appearing in electronic output).

The order of the partitions in a publication can be rearranged when the snapshot is taken and set in any order (by contrast, partitioning order is fixed in the family partitioning hierarchy).

The sequence of the families in a publication can be rearranged in any order (by contrast, the family sequence is fixed in the family partitioning hierarchy).

A family can be copied from the family partitioning hierarchy into the publication to include families that were not initially included in the publication.

Each family can appear in multiple locations in the publication, can be individually formatted, can include a different subset of the columns and common information, and can contain a different subset of the records in the family (by contrast, each family in the family partitioning hierarchy can appear only once, contains a fixed subset of the columns and common information, and contains all of the records).

Additional features for paper publishing that allow publication-specific restructuring and reformatting of each family as well as the entire publication are listed in the table below:

TABLE 26

| Feature | Description |
| --- | --- |
| Layout Detail | Change any or all of the tabular layout format settings of the current node |
| Column Names | Change any of the display names for the current node |
| Records | Exclude any of the records of the current node, or include any that had been masked out |
| Family Data | Exclude any common information of the current node |
| Refresh Options | Include or exclude new records, columns, or common information |
| Detail | Display the criteria for the current node |
| Format | Specify additional formatting options |

Embodiments of the inventions offer several improved solutions over existing methods for database driven publishing. Embodiments of the invention provide means for layering both the electronic and paper publishing process on top of the same extended taxonomy structure for automatically formatting and publishing database data.

The invention uses tabular layout formats that are captured and stored in the database alongside the product data itself, instead of storing the formatting in the page layout. The invention provides means for publishing high-quality output to the web using layout information stored in the database. In addition, the invention uses the API of the page layout program (or intermediate ASCII file format) to render pages automatically. Further, the invention allows for applying a product mask when the publication is first created. Finally, it also allows the layout detail, column names, set of records, and common information to be individually customized for each family of a particular publication.

An embodiment of the invention is implemented in a database system to build a catalog manager. A detailed description of a catalog manager is provided in Section B.

Section A

The following definitions will assist in understanding the discussion contained in this application:

A database is a logical collection of interrelated information, managed and stored as a unit.

A record is a representation of a real-world object such as a person, a product, or a company. A record consists of one or more individual data elements.

A field describes one of the data elements of a record and is common to all the records in a table.

A table is a simple, rectangular, row/column arrangement of related data values. Each horizontal row in the table represents a single record and consists of the same set of fields. Each vertical column of the table represents one field that is stored for each row in the table.

A relational database is a database in which all data is organized into tables that may be related by matching columns.

A hierarchy is a table in which the records have parent/child relationships. A node is another term for a record in a hierarchy.

The root node of a hierarchy is a node that has no parent.

An internal node of a hierarchy is a node that has at least one child.

A leaf node of a hierarchy is a node that has no children.

An attribute is a data element that is not common to all the records in a table.

A category is a subset of the records of a table that has a set of common attributes. Each record in a table must belong to exactly one category.

A taxonomy is the partitioning of a table and its records into multiple categories, with or without hierarchy, along with the assignment of attributes to each of the categories.

A family defines a group of records in a table which are related by one or more common fields and/or attributes that have the same value, and which may also have additional fields of common information, such as an image, a logo, a paragraph of descriptive text, bullets of specifications, and so on.

A partition is the division of a group of records into one or more subgroups, each of which is defined by the set of records from that group that have a fixed set of values for one or more fields and/or attributes. The partition is specified by the set of fields and/or attributes whose values or value combinations will define the subgroups.

The partitioning table is also known as the family table and defines the partitions for the main table of records that is to be divided into partitions.

A partitioning hierarchy of a partitioning table is a hierarchy in which the nodes of the hierarchy represent partitions of the partitioning table. A partitioning node is a node in the partitioning hierarchy that corresponds to a particular family of records. Since a partition simply divides a group of records into sub-groups, the set of records represented by a partitioning node is exactly the set of records represented by combining the sets of records represented by each of the descendants of that partitioning node.

The root partitioning node (or root partition) represents the entire set of records of the partitioning table; each sub-node represents only those records which have the fixed set of field values defined by the partitions starting at that sub-node and tracing ancestors back up to the root; the entire set of leaf partitioning nodes (or leaf partitions) represents the entire set of records; and each record of the partitioning table belongs to one and only one leaf partitioning node. A base family is a family that corresponds to a leaf partitioning node.

Thus a method and apparatus for structuring, maintaining, and using families of data has been described. The invention, however, is defined by the claims and the full scope of any equivalents.

Catalog Manager Data Format

Overview

This document describes the current internal or low level database organization or schema for A2i Catalog databases. As such, it changes as a reflection of the growth or evolution of A2i products. The Catalog Manager Data Format (CMDF) document is confidential and proprietary to A2i, Inc.

Databases

On a given A2i Database Server a global database contains a list of all A2i Catalogs on that machine. The global database is always named A2i_xCat_DBs. Within it is a table that holds the logical or publicly known names of catalogs and the actual database names used for storage.

Three databases are used to represent each catalog.
- Base database that holds everything but image or Large Object data.
- Originals database that holds the bitmap data for the original imported images.
- Thumbnails database that holds the scaled down 200x200 bitmap data of the original imported images.

On Oracle servers, there needs to be a sequence called A2I_SEQUENCE starting at 1 incrementing by 1 for each of the 3 databases.

Catalog Table

There is a single table called
_A2i_CM_Servers_

| SQL field name | SQL Field Type | Description |
|---|---|---|
| CatalogName | Varchar 128, not NULL | Logically or publicly known Name of an A2i Catalog. |
| MainDB | Varchar 30, not NULL | Name of the database for most non-binary data |
| OrigDB | Varchar 30, not NULL | Name of the database for original binary data |
| ThumbDB | Varchar 30, not NULL | Name of the database for scaled down image data |
| VariantDB | Varchar 30, not NULL | Name of the database for image variant data |
| Date1 | Date, NULL | Date/Time field for future or miscellaneous use |
| Description | Varchar 255, NULL | Miscellaneous use |

Create a Unique valued index on CatalogName

Each A2i Database Server may differ from other DB Servers. Any parameters or settings which are modified for an individual DB Server are maintained in the A2i_xCat_DBs database in a settings table.

Settings Table

There is a single table called
_A2i_CM_Settings_Error! Bookmark not defined.

| SQL field name | SQL Field Type | Description |
|---|---|---|
| Name | Varchar 128 | The name of the parameter. |
| Setting | Varchar 128 | The value the parameter is to take. |

Create a Unique valued index on Name

At the present time there are two settings:
    DataPath      The directory location where DB data files are to be created.
    BackupPath   The directory location where backup files are to be created.

Each Catalog has a table with a single record that is used to hold for state information

Server Table

There is a single table called
_A2i_Server_ that requires exactly 1 record.

| SQL field name | SQL Field Type | Description |
|---|---|---|
| ServerName | Varchar 50, not NULL, default empty string | Name of xCat Server (XCS.exe) that is currently using this SQL database. The XCS.exe program fills this in. |
| StartupTime | Datetime, not NULL, default any time | time the current server connected to this SQL database |
| LastCheckIn | Datetime, not NULL, default any time | last checkin time, the current server checks in every minute. |
| FamilyCatFieldId | Int 4, not NULL, Default 0 | main table field Id of the fields used as the base field in the family table. If no family table exists, this will be 0. |
| DBSchemaVersion | Int 4, not NULL, default 0 | Revision number of the database schema or structure. High order short integer is major version, low order short integer is minor version. XCS uses this to determine if it must upgrade the database structure. |
| LockVersion | Int 4, NULL | Used by administrative console program to lock database for structure changes |

Tables Table

This table contains the descriptions of all Primary Data Tables. Primary Tables have the name _A2i_x_ where x is a number starting at 1. The Primary Tables table has the following name:
_A2i_CM_Tables_
Note: Every entry in this table represents a Primary Table in the database. There is no need for a null entry.

5 . The Field Structure is as follows:

| SQL field name | SQL Field Type | Description |
|---|---|---|
| TableId | Int 4, not NULL, Primary Key | Id defining the table. First valid Id is 1. Unique. Actual table name is _A2i_x_ where x is the Id. |
| TableName | Varchar 50, not NULL | User readable name for the table. Not null or empty. Must be unique when converted to upper case and all whitespace is removed. |
| TableType | Int 4, not NULL | Type of table, valid values are: 0, 1, 2, 4, 11 Refer to the Table Type Schedule for a list of TableType values and a description of each. |
| Lookup | Varchar 50, not NULL | This is a text version of the field Id in this table that specifies which field represents the entire record. This field will replace the Id references in the linking table. So if the main table field indicates id's 3,4,5 the Lookup field from records with Id's 3,4,5 will be displayed in place of the numbers. The format is F*id*, so if the field Id of the lookup field is 100 the value of this field will be F100 |
| Params | Varchar 255, NULL allowed | MainTable : Id of associated MaskTable MaskTable : Id of associated MainTable HierAttrTable: Id of image object table |
| AttributeImageTableId | Int 4, not null, default 0 | Image Lob Data Table Id associated with this category table the images for its attributes. |
| FVImageTableId | Int 4, not null, default 0 | Image Lob Data Table Id associated with this category table the images for its feature values. |
| NextAutoId | Int 4, not null, default 1 | Tracks the next available Id field for the AutoId field type (not yet implemented, but necessary in the structure) |

Create a Primary, Unique Valued, Clustered Index on TableId
NOTE: the Views field has been removed.

Table Type Schedule

| TableType Value | Primary or Lob | TableType Description |
|---|---|---|
| 0 | P | MainTable |
| 1 | P | FlatTable, essentially the same as MainTable except it cannot currently have an associated Mask Table. |
| 2 | P | HierTable, Like Flat table, but every record has a parent record. The Id of the top-level node is 0. This table type is usually displayed in a tree format. |
| 4 | P | HierAttrTable, Hierarchy table having associated attributes. Each record in this table can be linked to 0 or more attributes. Children inherit their parent's links. Main Table records can be linked to leaf nodes in this table. |
| 5 | L | TextDataTableType, |
| 6 | L | ImageDataTableType |
| 7 | L | SoundDataTableType |
| 8 | L | VideoDataTableType |
| 10 | L | ExtDataTableType |
| 11 | P | MaskTable. This looks like a hierarchy table, except it always has a Mask field which contains a BitVector specifying which records in its linked MainTable apply to its own records. |
| 18 | L | PDFDocumentTable |

Table Type Schedule

*Field Type Schedule*

| Field Type Value | Field Type Description | DBMS Mapping | |
|---|---|---|---|
| | | SQL Server | Oracle |
| 0 | Integer Field, default value is NULL | Int 4 | Number (10) |
| 1 | Real4Field, allow NULLs, default value is NULL | Real 4 | Float |
| 2 | CurrencyField, allow NULLs, default value is NULL | Real 4 | Float |
| 3 | DateField, allow NULLs, default value is NULL | Datetime | Date |
| 4 | TimeField, allow NULLs, default value is NULL | Datetime | Date |
| 5 | BoolField, allow NULLs, default value is NULL | Tinyint | Number (3) |
| 6 | FixedWidthText, not NULL, default value is empty string | Char | Char |
| 7 | FlatSubTableField, holds Id of record in a separate FlatTable. The Lookup field for the record with the specified Id will be displayed. Used to allow the field to be parametrically searched upon. Not NULL, default value is 0 | Int 4 | Number (10) |
| 8 | HierSubTableField, same as FlatSubTableField, but links to HierTable. | Int 4 | Number (10) |
| 9 | INVALID, previously FlatAttrSubTableField | --- | --- |
| 10 | HierAttrSubTableField, same as HierSubTableField but with attributes. Not NULL, default value is 0 | Int 4 | Number (10) |
| 11 | FlatMultiSubTableField, this indicates this field will | --- | --- |

|    | | | |
|----|---|---|---|
|    | contain 0 or more links to a FlatTable. Being a virtual field, there will not be an actual field in the _A2i_x_ table. Values are stored in a separate table. Needed for data normalization and SQL query generation. SQL, no actual field. | | |
| 12 | TextField, contains Id of single large text block, not NULL, default 0 | Int 4 | Number (10) |
| 13 | MultiTextField, contains 0 or more ids of large text blocks. This is a virtual field in that there will not be an actual field in the _A2i_x_ file. The values will be stored in a separate table _A2i_x_f_ where x is the value of this table Id and f is the value of this field id. | Int 4 | Number (10) |
| 14 | ImageField. This contains the Id of a single image, not NULL, default 0 | Int 4 | Number (10) |
| 15 | MultiImageField. This indicates this field will contain 0 or more image ids. This is a virtual field in that there will not be an actual field in the _A2i_x_ file. The values will be stored in a separate table _A2i_x_f_ where x is the value of this table Id and f is the value of this field id. | Int 4 | Number (10) |
| 16 | SoundField, Not Yet Implemented (NYI) | --- | --- |
| 17 | MultiSoundField, NYI | --- | --- |
| 18 | VideoField, NYI | --- | --- |
| 19 | MultiVideoField, NYI | --- | --- |
| 20 | Reserved for Future Use | --- | --- |
| 21 | Reserved for Future Use | --- | --- |
| 22 | ExtField, NYI | --- | --- |
| 23 | MultiExtField, NYI | --- | --- |
| 24 | Name field, Text string containing text and codes to represent Title, First, Middle, Last, suffix for name. Format to be determined. SQL Varchar, not NULL, default empty string | Varchar | Varchar2 |
| 25 | MeasurementField used when a number is not descriptive enough. Examples are length or temperature. This will generate 2 fields in the _A2i_x_ table, Fx and Ux. Fx is the actual value as a real 4 allow NULLs; Ux is the unit of measure int 4 allow NULLs, | real 4 and int 4 | Float and Number (10) |
| 26 | TimeStampField, used when both date and time are needed. Allow NULLs, default value is NULL | Datetime | Date |
| 27 | NormalizedTextField, special type of fixed width text field that sorts, and searches based on the normalized version of the string it contains. Normalization currently removes all non alpha-numeric characters. NOTE, the value if this field is the actual string value containing non-normalized characters, i.e. "12-34.b/56", however it sorts and searches as if the string were "1234b56", not NULL, default empty string | Varchar | Varchar2 |
| 28 | Real8Field, 8 byte floating point number, allow NULLs, default is NULL | Real 8 | Float |

| 29 | HierMultiSubTableField, same as FlatMultiSubTableField (11) but the table it links to is a hierarchy table. | --- | --- |
|---|---|---|---|
| 30 | Internal type, not allowed as actual field | --- | --- |
| 31 | MultiTemplateField, NYI | --- | --- |
| 32 | PDFDocumentField, NYI | --- | --- |
| 33 | MultiPDFDocumentField, NYI | --- | --- |
| 34 | AutoIdField, not NULL, Create a Unique index on this field | Int 4 | Number (10) |
| 35 | LargeTextField, allow NULL (Oracle: default Empty_Clob()) | Text | CLob |
| 36 | LogField, allow NULL (Oracle: default Empty_Clob()) | Text | CLob |
| 37 | Multi Measurement Field. This indicates this field will contain 0 or more Measurements(Value, Units). This is a virtual field in that there will not be an actual field in the _A2i_x_ file. The values will be stored in a separate table _A2i_x_f_ where x is the value of this table Id and f is the value of this field id. | --- | --- |

*Field Type Schedule*

Fields Table:

Describes every non-Id field in all the primary tables in the database. Id fields are assumed to always exist in every primary table and have the field name Id. They are not included in this table. The fields table has the following name
_A2i_CM_Fields_

All entries refer to fields; there is no need for a null entry.

Note, the Description of FieldType specifies the SQL field types for the primary tables.

The Field Structure is as follows

| SQL field name | SQL Field Type | Description |
|---|---|---|
| PermanentId | Int 4, not NULL, Identity (1, 1) | Ever increasing Id used to make sure newly added records are not confused with previous records that had the same id. Oracle does not need the Identity(1,1) descriptor. |
| FieldId | Int 4, not NULL, Primary Key | Id defining the field. First valid Id is 1. Unique. Actual table field names are Fx where x is the Id. Exceptions: Field type 11 has no physical field in the _A2i_x_ table Field type 25 has an additional Ux field to specify type of units. |
| TableId | Int 4, not NULL | Table Id to which this field belongs |
| FieldName | Varchar 128 | User readable name for the field. Not null or empty. Must be unique among all FieldNames for a given TableId when converted to upper case and all whitespace is removed. |
| FieldType | Int 4, not NULL | Type of field, valid values are 0 to 36 Refer to the Field Type Schedule for a list of FieldType values and a description of each. |
| FieldParams | Varchar 255 not NULL, default "" | This provides extra information for some of the above field types. If any of these fields require spaces after the last non-space character, you may enclose this field in "" marks. These double quotation marks are stripped off when this field is read in to the xCat server. The field types and their format are: |
| | | 2 - (CurrencyField), the number of decimal places, whether to allow fractions (0, 1) and the actual currency symbol(s) to preceed the currency amount. examples:<br>    2,0,"eur " --- (2 decimal, no fractions)<br>    3,1,"$" --- (3 decimal, allow fractions) |
| | | 5 - Boolean Field<br>    {True String} | {False String} | T or F |

| | | |
|---|---|---|
| | | Example, Red I Blue I T means the True String is Red, False String is Blue and the default is the True String (Red). |
| | | 6, 27 (FixedWidthText, NormalizedText)- number of characters |
| | | 7,8,10 - _A2i_x_ primary tableId that this field links to. Optionally followed by comma and the default value for new records. TableId[, default value]. If no value is specified or the value is not a valid record, the default value is 0 |
| | | 11,29 - _A2i_x_ primary tableId that the id's in this field refer to. Being multi-valued fields, the default value is always none. |
| | | 12,14,16,18,22,32 - _A2i_data_x_ object data table Id that this field refers to. |
| | | 13,15,17,19,23,31,33 - _A2i_data_x_ object data table Id that this field refers to. |
| | | 25, 37 - decimal places, allow fractions, Measurement Type Id, Defaults Units of Measure Id. E.G. 3,1,1,1 --- 2 decimal places, allow fractions, meas id 1, units id 1 -1,0,0,0 --- max float decimal places, no fractions, meas 0, id 0 |
| | | 3,4,26 DateField, TimeField, and TimeStampField. To use the current time as the default value put a T here, otherwise leave it blank or put an F here. Valid values are T, F or nothing at all. |
| Position | Int 4, not NULL | Holds the default display position for fields within a table. Beginning with 0, each position is unique per TableId. Each user can override the default at his workstation. |
| UseInKeyword | Bit 1, not NULL, default 0 | Determines whether it can be used in keyword searches |

5    Create a Primary, Unique Valued, Clustered Index on FieldId
Create a Unique Valued Index on TableId, Position

Direct Data Tables

Primary Tables

These tables contain all non-attribute-related information.

These tables are named:
_A2i_x_
where x is the Id specified in the TableId field of _A2i_CM_Tables_. In typical usage, when there are multiple tables having this form, one table is considered the main table with the remainder acting as sub tables used for multi-values, etc. However there is no theoretical limit to the number of main tables.

Every primary table has the following fields

| SQL field name | SQL Field Type | Description |
|---|---|---|
| Id | Int 4, not NULL, Primary Key | Id of the record. Valid Id's start at 1 for new records |
| PermanentId | Int 4, not NULL, Identity (1, 1) | Ever increasing Id used to make sure newly added records are not confused with previous records that had the same id. Oracle does not need the Identity(1,1) descriptor. |

Create a Primary, unique valued, clustered index on Id

Every primary table has a permanent NULL record with Id = 0 and all fields set to the default value for that field type. See the description of the _A2i_CM_Fields_ table for the default values. When creating a database, make sure all _A2i_x_ tables have this NULL record.

This NULL record is needed because any table can be a lookup for another table. On initial record creation for a table, all fields must contain valid values. This means all lookup fields must link to an actual record in another table. By default they link to this empty record. This maintains a valid database even if the lookup fields are not changed.

Other fields have names F*x* where x is the FieldId specified in the _A2i_CM_Fields_ table. The types of these fields are specified in the _A2i_CM_Fields_ table. We have several reasons to use field names F*x* instead of more human friendly names like 'Color field'.

5711   Performance. We only need to know the Id of a field to access it. This results in less storage in the server and client components and small network packets. It also speeds up the search for a particular field.

05711.914    50

5712                                Cross Database independence. This format is valid for SQL databases, Codebase, MS Access or any other standard database system. We use each database simply as a container. By restricting the field names, we guarantee that all names will comply with naming conventions on the various database systems used.

Some exceptions to this general naming of fields F$x$ are as follows:
- Any multi-valued fields, Field type 11 (FlatMultiSubTableField) and 29 (HierMultiSubTableField) and object data fields 13,15,17,19,23,31,32,33 do not have physical fields in the _A2i_$x$_ table
- Field type 25 (MeasurementField) has an additional field named U$x$ (where $x$ is the FieldId) used to specify the type of units used.

Mask Tables:

A Mask table is a special type of primary hierarchical table with an additional field called Mask. Following the same rules, it is named:    _A2i_x_
This additional Mask field stores the bits of a BitVector to track record Ids in another linked table. It is like a sub-table in that each of the records in this table correspond to multiple records in a linked main table, however the link is stored in this table as a mask instead of in the main table as a category field. For example, a record in the mask table with the mask having bits 1,2 and 10 set means that this record corresponds to records in its linked main table with record ids 1, 2 and 10.

In the _A2i_CM_Tables_ table, the mask table entry has a type of
    11 = MaskTable
and the Params field is the table Id of the linked main table.
The main table has its Params field set to the Id of the mask table Similar to other primary tables, every mask table has a standard Id field and also has any fields specified for it in the _A2i_CM_Fields_ table. The additional Mask field, described below, differentiates it from other primary tables.

| SQL field name | SQL Field Type | Description |
|---|---|---|
| Mask | Image 16, not NULL, default value (0x00) | Bit field of the corresponding record ids in the linked main table |

Hierarchy Tables:

A Table of type HierTable and HierAttrTable table relies on an additional table to describe the hierarchy relationship. The table is named:
_A2i_H_x_
where x is the TableId of the HierTable or HierAttrTable The structure of this table follows:

| SQL field name | SQL Field Type | Description |
|---|---|---|
| Id | Int 4, not NULL, Primary Key | Id of an existing Id in the _A2i_x_ HierTable or HierAttrTable, where x is the same value as in this tables name |
| ParentId | Int 4, not NULL | Parent Id. Must specify an existing Id in the A2i_x_ table, where x matches. |
| Position | Int 4, not NULL | Position of this node under its parent. First position is 0. No missing positions are allowed, it must be 0,1,2,3 .. and so on. If a node is removed all children after it must have their positions decreased by 1. If a child is inserted, all nodes after it must have position increased by 1. |
| ShowChildren | Bit, not NULL | Determines whether the descendents of this node should be displayed in the search lists, and replaced with this node's name in the result list. Set to 1 means children are shown, set to 0 means children are hidden and replaced |
| OriginalId | Int 4, not NULL, use 0 as default to convert existing databases | Id of original record that this node is an alias of. OriginalId = 0 means this is an original node. |

Create a Primary Key, Unique Valued, Clustered Index on Id.
Create a Unique Index on ParentId + Position.

This table should contain a master parent record with:
    Id = 0
    ParentId = -1
    Position = -1
    ShowChildren = 1
    OriginalId = 0

All top-level nodes will then use this record as their parent.

Multi Value Tables:

Fields with type 11 (FlatMultiSubTableField), 29 (HierMultiSubTableField), object data fields 13,15,17,19,23,31,32,33 and MultiMeasurementField 37 do not have physical fields in their data table. The lookup Ids are stored a separate multi-value table.

The multi-value tables are named
_A2i_x_f_
where     x is the TableId of the table containing a multi-valued field.
          f is the FieldId of the field.

The structure of this table follows for type 11,29,13,15,17,19,23,31,32,33:

| SQL field name | SQL Field Type | Description |
|---|---|---|
| Id | Int 4, not NULL, Primary Key | Id of an existing Id in the _A2i_x_ where x is the same value as in this table's name. |
| SubId | Int 4, not NULL | SubId. Must specify an existing Id in the lookup table A2i_n_ or A2i_Data_n_. n is a simple number taken from A2i_CM_Fields_.FieldParams where A2i_CM_Fields_.FieldId = f and is dependent on A2i_CM_Fields_.FieldType being on of several Multi-Value Field Types [ via the IsMultiValuedField() test] |

Create a non-Unique, clustered index on Id.
Create a Unique Index on Id, SubId
Create a non-Unique Index on SubId The structure of this table follows for type 37:

| SQL field name | SQL Field Type | Description |
|---|---|---|
| Id | Int 4, not NULL, Primary Key | Id of an existing Id in the _A2i_x_ where x is the same value as in this table's name. |
| Value | real 4, not NULL | Measurement Value |
| Units | Int 4, not NULL | Measurement Units Id |
| Position | Int 4, not NULL | Position in list of value for this Id |

Create a non-Unique, clustered index on Id.
Create a Unique Index on Id, Position The reason the multi value lookup fields are stored in a separate table was to normalize the database to allow for SQL queries to search on multi value criteria and to return results stored in multi value fields.

Attribute Tables

Attributes

What is an Attribute?
An attribute is a parameter used to classify and describe a record, (i.e. 'screen size' of a monitor). It is similar to a category but only applies to subset of the entire record set. If it applied to all records it would simply be a category. This means that one group of records will have one set of attributes describing them, while another group of records will have completely different attributes describing them. An example is 'screen size' of a monitor and 'processor speed' of a computer. Both monitors and computers are records in the same table but they have different attributes describing them.

How Attributes Relate To Records:
Attributes apply to groups of records. A group of records is specified by creating an HierAttrSubTableField in the main primary table and setting the value of this field to the Id of a record in a table of type HierAttrTable. For Example, an HierAttrSubTableField called 'SampleCategoryField' can be created in the main primary table, and another primary table of type HierAttrTable called 'SampleCategoryTable' can be created. One record in the 'SampleCategoryTable' may be a record describing the 'Monitor' category. Now all records in the main primary table with 'SampleCategoryField' linked to the record describing the 'Monitor' category in 'SampleCategoryTable' are in the Monitor group.

Attributes are assigned to a group by linking them to a set of records in a table of type HierAttrTable. Continuing the example, an attribute called 'Screen Size' can be linked to the record in 'SampleCategoryTable' that describes the 'Monitor' category. Now all records in the main table with 'SampleCategoryField' that link to the record describing the 'Monitor' category in "SampleCategoryTable' will have the 'Screen Size' attribute.

NOTE: For each table of type HierAttrTable, only 1 field of type HierAttrSubTableField in the entire database can link to it.

An attribute is either Text or Numeric. Previously these were referred to as Feature (for Text) and Characteristic (For Numeric). The naming of fields and tables still refers to Features and Characteristic:

A Text Attribute is an enumerated list of Text Values. An example is "Valve Type". There is a small finite set of valve types.

A Numeric Attribute is continuous. An example is length. Although you could enumerate all lengths in a list of products you gain certain advantages by treating it as Numeric. One is searching by range (not yet implemented). Another is the ability to convert between units (feet to meters).

Attribute Definition Tables:

These tables contain the definitions of all attributes in the database.

They are named

_A2i_A_x_ where x is the TableId of the HierAttrTable that contains all the categories that these attributes are allowed to link to.

The structure of this table follows:

| SQL field name | SQL Field Type | Description |
|---|---|---|
| AttrId | Int 4, not NULL | Id defining the Attribute. First valid Id is 0. Cannot repeat within this table. |
| PermanentId | Int 4, not NULL, Identity (1, 1) | Ever increasing Id used to make sure newly added records are not confused with previous records that had the same id. Oracle does not need the Identity(1,1) descriptor. |
| AttrName | Varchar 128, not NULL | Human readable name. This will be displayed when searching or viewing records |
| AttrType | Int 4, not NULL | Determines if this is a Feature (Text) or a Characteristic (Number) and what values the attribute contains. Use bitwise OR on the following values to generate the AttrType. If any flags are set, this attribute is a Characteristic, otherwise it is a Feature<br>1 - Minimum<br>2 - Maximum<br>4 - Typical<br>8 - Nominal (most common)<br>16 - Average |
| AttrDefn | Varchar 255, not NULL | Long description of the attribute |
| AttrAlias | Varchar 128, not NULL | Not used yet, leave blank |
| AttrParam | Int 4, not NULL | For Characteristics this determines the measurement type.<br>1 - length<br>2 - weight<br>For Features this determines whether the attribute is single or multi select<br>0 - single select<br>not 0 - multi select |
| DecimalPlaces | TinyInt 1, not NULL | For Characteristics this determines the number of places after the decimal to |

| | | display. The default is 3, meaning that the value 0.0255 will be displayed as 0.026. The specified number of places are always used so that the number 4 will be displayed as 4.000 |
|---|---|---|
| AllowFractions | Bit 1, not NULL, default 0 | ?? |
| MeasurementType | Int 4, not NULL | For Characteristics this determines the measurement type of the value. Possible values are:<br>0 = None<br>1 = Length |
| UnitsOfMeasure | Int 4, not NULL | For Characteristics this determines the default units of measure of the value. This is the value that is automatically filled in when you set the attribute value from the catalog client. Also when you change the MeasurementType of an attribute, the first units of measure that you select will automatically overwrite the current units for all data values of this attribute. Its interpretation depends on the value of the MeasurementType field: |
| ImageId | Int 4, not NULL | Image Id of the image for this attribute. The Image Table Id is contained in the tables' table Params field for the associated category table. |
| IsMultiValued | Bit, not NULL | Indicates whether this Attribute record ? |
| CoupledAttrName | Varchar 128, not NULL | |
| CoupledDecimalPlaces | TinyInt 1, not NULL, | |
| CoupledAllowFractions | Bit, not NULL | |
| CoupledMeasurementType | Int 4, not NULL | |
| CoupledDefaultUnitsOfMeasure | Int 4, not NULL | |
| CoupledSymmetricSearch | Bit, not NULL | |

5   Create a Unique Valued, Clustered Index on AttrId

Category Attribute Linkage Tables:

These tables determine which attributes apply to which categories (categories are records in a table of type HierAttrTable). By creating a record in this table you link an attribute to a category. All records in a separate table linked to that category will be described by the Attribute.

The names of these tables are
_A2i_CA_x_
> where x is the TableId of the HierAttrTable that contains all the categories that the Attributes are allowed to link to.

The structure of this table follows:

| SQL field name | SQL Field Type | Description |
|---|---|---|
| Id | Int 4, not NULL, part of Primary Key | Id defining the Category. Must specify an existing Id in the _A2i_x_ FlatAttrTable or HierAttrTable, where x is the same value as in this tables name |
| AttrId | Int 4, not NULL, part of Primary Key | Attribute Id. Must specify an existing AttrId in the A2i_A_x_ attribute definition table, where x matches. |
| Priority | Int 4, not NULL | Priority of this attribute link. Lower numbers cause this attribute to appear higher in the list of all attributes linked to this category or any of its descendants. Valid values are 1 to 100, default 50. |

Create a Non-Unique, Clustered Index on Id.
Create a Primary, Unique Valued Index on Id + AttrId.
Create a Non-Unique Index on AttrId.

What is Attribute Priority? This number ranks the attributes linked to a particular category according to importance of display.

When a single category is selected in a Search Pick List, the attributes linked to that category and all of its ancestors are shown. Attributes with lower priorities are shown first. Attributes with the same priority are sorted by Attribute Name.

When a result set of records all having the same category is displayed. The attributes are displayed as above.

We don't yet know what to do if the records have different categories because that could cause the same attribute to be linked with two different priorities.

Feature Values Tables

These tables determine the possible Text Values for all Text Attributes relating to a specific category table.

The names of these tables are:
_A2i_FV_x_
> where x is the TableId of the HierAttrTable that contains all the categories that these attributes are allowed to link to.

The structure of this table follows:

| SQL field name | SQL Field Type | Description |
|---|---|---|
| AttrId | Int 4, not NULL, part of Primary Key | Attribute Id. Must specify an existing AttrId in the A2i_A_x_ attribute definition table, where x matches. |
| FeatureId | Int 4, not NULL, part of Primary Key | Id defining the enumerated value. The Ids start at 0, and should only be unique for all records with the same AttrId. Records with different AttrIds should start again at 0. |
| PermanentId | Int 4, not NULL, Identity (1, 1) | Ever increasing Id used to make sure newly added records are not confused with previous records that had the same id. Oracle does not need the Identity(1,1) descriptor. |
| FeatureName | char 128, not NULL | Human readable description of this attribute. Examples are 'white', 'air valve', 'Pentium II' |
| ImageId | Int 4, not NULL, default 0 | Image Id of this feature's image |
| Position | Int 4, not NULL, default 0 | position of this text value in the display of all text values. Starts at 0 and cannot have gaps, unless all values are 0. If all are 0, the server will set the values to the natural order when you rebuild indices. This allows you to easily convert old database. |

Create a Non-Unique, Clustered Index on AttrId.
Create a Primary Key, Unique Valued Index on AttrId + FeatureId.
Create Unique Valued Index on AttrId + Position Note : FeatureId should only be unique for records with the same AttrId. Each time the AttrId changes, start FeatureId at 0 again. This allows us to use smaller structures to store the Feature Id's in memory resulting in less memory usage and faster searches.

Feature Entries Tables

This is where all the Feature data is. These tables store the actual Text values selected for a particular Feature Attribute of a particular record.

The names are:
_A2i_F_x_
   where x is the TableId of the HierAttrTable that contains all the categories that the attributes are allowed to link to.

The structure of this table follows:

| SQL field name | SQL Field Type | Description |
|---|---|---|
| Id | Int 4, not NULL | Main Product Id. Must specify an existing Id in the _A2i_x_ primary table, where x matches this table. |
| AttrId | Int 4, not NULL | Attribute Id. Must specify an existing AttrId in the _A2i_A_x_ attribute definition table, where x matches. |
| FeatureId | Int 4, not NULL | Defines the enumerated value. Must specify an existing FeatureId in the _A2i_FV_x_ Feature Enumerated Value table. |
| Position | Int 4, not NULL | The ordering position for multiple features of a record. Beginning with 0, each position is unique per Id. |

Create a non-Unique Valued, Clustered Index on Id, very important for performance
Create a Unique Valued Index on Id + AttrId + FeatureId
Create a non-Unique Valued, Index on Id + AttrId
Create a non-Unique Valued, Index on AttrId + FeatureId A record in this table indicates that for the record matching Id, its Attribute matching AttrId has the Text Value matching FeatureId.

Characteristic Entries Tables

This is where all the Numeric Attribute data is. These tables store the actual Numeric values selected for a particular attribute of a particular record.

The names are:
_A2i_C_x_
    where x is the TableId of the HierAttrTable that contains all the categories that the Characteristic Attributes are allowed to link to.

The structure of this table follows:

| SQL field name | SQL Field Type | Description |
| --- | --- | --- |
| Id | Int 4, not NULL, part of Primary Key. | Main Product Id. Must specify an existing Id in the _A2i_x_ primary table, where x matches this table. |
| AttrId | Int 4 not NULL, part of Primary Key | Attribute Id. Must specify an existing AttrId in the _A2i_A_x_ attribute definition table, where x matches. |
| CharType | TinyInt 1, not NULL, part of Primary Key | Characteristic type. Must be exactly one of the possible flags set in the AttrType field of the _A2i_A_x_ attribute definition table for the attribute with AttrId equal to the previous field's value. There should be one record in this table for each flag set in the attribute definition table for the Attribute defined by AttrId for every main product Id |
| Value | Real 4, not NULL | Actual value of this attribute. For example 3 1/4 inches would be 3.25 |
| Position | Int 4, not NULL | The ordering position for multiple attributes of a record. Beginning with 0, each position is unique per Id. |
| Units | Int 4, not NULL | Type of units for the Value field above. This is an enumeration whose valid values and descriptions depend on the AttrParam field in the attribute definition table for the attribute with AttrId. Currently these are:<br>If AttrParam =<br>  0 (none), Units can be<br>    0 - none<br>  1(length), Units can be<br>    1 = mm<br>    2 = inches |

Create a non-Unique Valued, Clustered Index on Id, very important for performance
Create a Unique Valued Index on Id + AttrId + CharType
Create a non-Unique Valued, Index on Id + AttrId

Coupled Numeric Entries Tables

This is where all the Coupled Numeric Attribute data is. These tables store pairs of actual Numeric values selected for a particular attribute of a particular record.

The names are:
_A2i_CN_x_
> where x is the TableId of the HierAttrTable that contains all the categories that the Characteristic Attributes are allowed to link to.

The structure of this table follows:

| SQL field name | SQL Field Type | Description |
|---|---|---|
| Id | Int 4, not NULL | Main Product Id. Must specify an existing Id in the _A2i_x_ primary table, where x matches this table. |
| AttrId | Int 4 not NULL | Attribute Id. Must specify an existing AttrId in the _A2i_A_x_ attribute definition table, where x matches. |
| Value | Real 4, not NULL | Actual value for the left side this attribute. For example 3 1/4 inches would be 3.25 |
| Units | Int 4, not NULL | Type of units for the Value field above. This is an enumeration whose valid values and descriptions depend on the MeasurementType field in the attribute definition table for the attribute with AttrId. See the current units schedule for a list of unit types. |
| CoupledValue | Real 4, not NULL | Actual value for the right side of this attribute. For example 3 1/4 inches would be 3.25 |
| CoupledUnits | Int 4, not NULL | Type of units for the Value field above. This is an enumeration whose valid values and descriptions depend on the MeasurementType field in the attribute definition table for the attribute with AttrId. See the current units schedule for a list of unit types. |
| Position | Int 4, not NULL | The ordering position for multiple attributes of a record. Beginning with 0, each position is unique per Id. |

Create a non-Unique Valued, Clustered Index on Id, very important for performance
Create a Unique Valued Index on Id + AttrId + Position
Create a non-Unique Valued, Index on AttrId
Create a Unique Valued, Index on Id + AttrId + Value + Units + CoupledValue + CoupledUnits Following is an example of some couples _____350 hp @ 2500 rpm _____375 hp @ 3000 rpm

Matching Sets Table

Quick description of matching sets

Matching sets are a way of associating products in one category with products in another category. For example Nuts and Bolts are two categories. The products in the Nuts category match the products in the Bolts category if their Width and Thread Pitch match. A matching consists of the two categories and a list of the common attributes that must match for a product to be considered a match.

The matching set tables store the matching set information. The names are

_A2i_MS_x_ where x is the TableId of the HierAttrTable that contains the categories that have the groupings.

No primary key is needed

| SQL field name | SQL Field Type | Description |
|---|---|---|
| Id1 | Int 4, not NULL | Category Id. Must specify an existing Id in the _A2i_x_ primary table, where x matches this table. |
| Id2 | Int 4, not NULL | Category Id. Must specify an existing Id in the _A2i_x_ primary table, where x matches this table. |
| Cat1AttrId | Int 4 not NULL | Attribute Id. Must specify an existing AttrId in the _A2i_A_x_ attribute definition table, where x matches. |
| Cat1Rating | Int 4 not NULL | For Text Attributes, this always equals -1. For Numeric Attributes, this is the rating to match on. If the value is set to -1 for numeric attributes, the first available rating will be chosen and written to sql when you start the database with the rebuild indices option. This allows easy updating of previous databases |
| Cat2AttrId | Int 4 not NULL | same as Cat1AttrId |
| Cat2Rating | Int 4 not NULL | same as Cat1Rating |

Ix_MS_x_Id1, non-unique index on Id1
Ix_MS_x_Id2, non-unique index on Id2

Family Tables

Families

<u>Quick description of families.</u>
Families are a way of grouping records by structured queries, then assigning common information to the groups and organizing each group's display of its records. Each group of records is called a family.

Families are created by Partitioning the records based on a category, then sub-partitioning these groups based on other categories or attributes. With the exception of the first partition, families only exist where the combination of values in the partitioned fields/attribute results in a non-zero set of records.

The first partition is special in a few ways:
1) Its partition field is specified in the _A2i_Server_ table, FamilyCatFieldId
2) It can only be a field, not an attribute, because attribute do not exist at a global level
3) If you wish to partition on attributes, the category field that uses attributes must be this first partition
4) Families in the first partition ALWAYS exists even if no records belong to them. This is a convenience to allow some initial family setup before all the data is entered.

Within a group, the records can be Pivoted by Depth, Vertically or Horizontally. This extracts the values of the pivot field and makes a separate section for records with that value.

Family Structure Table

This table holds all the partition, pivot, sorting, ordering and hidden information. Structure is tied to a family node. All children then inherit it, unless the child overrides the inheritance. Children can override each type of structure element individually.

Partition - This determines the hierarchy of the family tree. Only main table lookup fields, and Text Attributes are allowed in the partition. Numeric attributes are not allowed. Every time you add a field/attribute to the partition, you create additional child family nodes below the current child nodes. The records will be split up according to the values they have for the new partition field/attribute.

Pivot (Depth, Vertical, Horizontal) - This also splits up records into groups, but is used for display only. It does not create new family nodes Sorting - This specifies which fields/attributes to sort on in the final display. More than one field/attribute can be used. The display will sort first on the first field/attribute, then on the second, etc.

Ordering - This is the display order of the fields/attributes in the final display.

Hidden - This is a list of fields/attributes that should not be displayed.

Partition and Pivot allow you to concatenate multiple fields at the same level. This has a slightly different effect than placing the fields on different levels. For example, a family has 2 attributes available for partitioning, Color(red, blue) and Horsepower(gutless, gas-guzzler). Creating 2 partition levels, the first with Color and the second with Horsepower would look like.

```
red family
     gutless family
     gas-guzzler family
blue family
     gutless family
     gas-guzzler family
```

If you added a single partition level with Color and Horsepower, Color would be in NestedPosition = 0, Horsepower in NestedPosition = 1, and you'd get

```
red - guttless family
blue - gas-guzzler family
red - guttless family
blue - gas-guzzler family
```

The name of the table is

_A2i_FamilyStructure_

The structure of this table follows:

| SQL field name | SQL Field Type | Description |
|---|---|---|
| FamilyItemId | Int 4, not NULL | Family Item Id, root has ItemId = 0, others continue from 1 on up. |
| StructureType | Int 4, not NULL | Structure type specified:<br>1 = FamilyPartition<br>2 = FamilyDepthPivot<br>3 = FamilyHorizontalPivot<br>4 = FamilyVerticalPivot<br>5 = FamilySorting<br>6 = FamilyOrdering<br>7 = FamilyHidden |
| NestedPosition | Int 4, not NULL | Position for Structure Type in this Family. Starts with 0, the next additional position is 1, etc. |
| ConcatenationPosition | Int 4, not NULL | Position within a NestedPosition that this item exists in. The first position is 0, then 1 and so on.<br>For StructureTypes 5,6,7 this is always 0.<br>For StructureTypes 1,2,3,4, you may have more than 1 field specified for a partition or pivot, in that case the second field has position 1, and so on. |
| FieldOrAttrId | Int 4, not NULL | Main Table Field Id or Attribute field Id |
| IsAttributeField | Bit, not NULL | Whether this is an attribute or a main table field |
| Rating | Int 4, not NULL | If not an attribute field set it to 0.<br>For Features set it to -1(InvalidRating)<br>For Characteristic set it to the one of the following values<br>    1 = Minimum<br>    2 = Maximum<br>    4 = Typical<br>    8 = Nominal<br>    16 = Average |
| SortType | Int 4, not NULL | Only used for Structure Type 5(FamilySorting).<br>    1 = ascending<br>    0 = descending |

Create a Unique Index on FamilyItemId, StructureType, NestedPosition, ConcatenationPosition 5  Family Structure Recycled Table This table holds information about familiy nodes that have been deleted, but had family structure information defined.

The name of this table is
10  _A2i_FamilyStructureRecycled_

The structure of this table follows:

| SQL field name | SQL Field Type | Description |
|---|---|---|
| FamilyItemId | Int 4, not NULL | Recycled Family Item Id, start from 1 on up. No root is necessary |
| StructureType | Int 4, not NULL | Structure type specified:<br>1 = FamilyPartition<br>2 = FamilyDepthPivot<br>3 = FamilyHorizontalPivot<br>4 = FamilyVerticalPivot<br>5 = FamilySorting<br>6 = FamilyOrdering<br>7 = FamilyHidden |
| NestedPosition | Int 4, not NULL | Position for Structure Type in this Family. Starts with 0, the next additional position is 1, etc. |
| ConcatenationPosition | Int 4, not NULL | Position within a NestedPosition that this item exists in. The first position is 0, then 1 and so on.<br>For StructureTypes 5,6,7 this is always 0.<br>For StructureTypes 1,2,3,4, you may have more than 1 field specified for a partition or pivot, in that case the second field has position 1, and so on. |
| FieldOrAttrId | Int 4, not NULL | Main Table Field Id or Attribute field Id |
| IsAttributeField | Bit, not NULL | Whether this is an attribute or a main table field |
| Rating | Int 4, not NULL | If not an attribute field set it to 0.<br>For Features set it to -1(InvalidRating)<br>For Characteristic set it to the one of the following values<br>    1 = Minimum<br>    2 = Maximum<br>    4 = Typical<br>    8 = Nominal<br>    16 = Average |
| SortType | Int 4, not NULL | Only used for Structure Type 5(FamilySorting).<br>    1 = ascending<br>    0 = descending |

Create a Unique Index on FamilyItemId, StructureType, NestedPosition, ConcatenationPosition Family Items Table This table holds basic information about the family. It is a global table that applies to the main table in the database.

_A2i_FamilyItems_

| SQL field name | SQL Field Type | Description |
| --- | --- | --- |
| FamilyItemId | Int 4, not NULL | Family Item Id, unique, root has Id = 0, others continue from 1 on up. |
| ParentId | Int 4, not NULL | Parent Id of this item |
| RelativePosition | Int 4, not NULL | Relative position of this family item within its siblings. Because families only exist where their query results in a non-empty set of records, not all combinations of the partitioned fields result in families. The relative position is based on the actual position of the partitioned fields' attributes |
| InheritPartition | Bit, not NULL | 1 when family item inherits this value from its parent |
| InheritDepthPivot | Bit, not NULL | 1 when family item inherits this value from its parent |
| InheritVerticalPivot | Bit, not NULL | 1 when family item inherits this value from its parent |
| InheritHorizontalPivot | Bit, not NULL | 1 when family item inherits this value from its parent |
| InheritSorting | Bit, not NULL | 1 when family item inherits this value from its parent |
| InheritOrdering | Bit, not NULL | 1 when family item inherits this value from its parent |
| InheritHidden | Bit, not NULL | 1 when family item inherits this value from its parent |

Create a Clustered, Unique Index on FamilyItemId

This table requires an initial ROOT node with the following values
    ItemId = 0
    ParentId = -1
    RelativePosition = -1
    Inherit* = 1 (all inherits set to 0)

Note : the user may assign structure information to this root node, so the inherit* values may change.

Since the first partition always results in families, this table must be initialized with all the values in the category table chosen as the first partition. The ItemId, ParentId, and RelativePosition may be initially set to the same value in the category table. Although these values may diverge after time.

Family Items Recycled Table

This table holds basic information about family nodes that have been deleted, but contained links to common information or structure. This allows users to recover their work when then make a change that destroys these families _A2i_FamilyItemsRecycled_

| SQL field name | SQL Field Type | Description |
| --- | --- | --- |
| FamilyItemId | Int 4, not NULL | Family Item Id |
| Description | Varchar 255, not NULL default empty string | Description of the family node. Since the position in the family hierarchy is lost by deleting a node, this description is a path to where the family used to be. i.e. Category:Bearings->Mfr:SKF->Type:ball. |
| InheritPartition | Bit, not NULL | 1 when family item inherits this value from its parent |
| InheritDepthPivot | Bit, not NULL | 1 when family item inherits this value from its parent |
| InheritVerticalPivot | Bit, not NULL | 1 when family item inherits this value from its parent |
| InheritHorizontalPivot | Bit, not NULL | 1 when family item inherits this value from its parent |
| InheritSorting | Bit, not NULL | 1 when family item inherits this value from its parent |
| InheritOrdering | Bit, not NULL | 1 when family item inherits this value from its parent |
| InheritHidden | Bit, not NULL | 1 when family item inherits this value from its parent |

Create a Clustered, Unique Index on FamilyItemId

Family Item Values Table

This table holds the information describing the partial query for each family node. Every node represents 1 or more criteria. Tracing the node back to the root gives you the entire query.

Nodes are allowed to have more than 1 field/value combination. This occurs when an ancestors partition specified more than 1 field for the partition's NestedPosition. This node then represents a concatenation of values.

This Family has the name
_A2i_FamilyItemValues_

| SQL field name | SQL Field Type | Description |
| --- | --- | --- |
| FamilyItemId | Int 4, not NULL | Family Item Id |
| FieldOrAttrId | Int 4, not NULL | Field or Attribute Id this value corresponds to |
| FieldOrAttrValue | Int 4, not NULL | Value of field. Since only lookup fields, and Text Attributes are allowed in the partition, this value is always a Uint32 |
| IsAttributeField | Bit, not NULL | Whether this is a lookup field value, or attribute text value |
| ConcatenationPosition | Int 4, not NULL | Where in the concatenation of values this value exists. This starts at 0, and continues if more than 1 field are concatenated at this partitions NestedPosition. |

Create a Clustered, non-Unique Index on FamilyItemId
Create a Unique Index on FamilyItemId + ConcatenationPosition The initial table needs a definition for the ROOT node.
ItemId = 0
FieldId = (main table category field Id used as base category field for family tree)
FieldValue = 0
IsAttributeField = 0
ConcatenationPosition = 0

Family Fields Table

This table specifies which fields all families have. Just like primary tables, families can have fields. The field values apply to all records in the family.

The name of this table is
_A2i_FamilyFields_

| SQL field name | SQL Field Type | Description |
|---|---|---|
| PermanentId | Int 4, not NULL, Identity (1, 1) | Ever increasing Id used to make sure newly added records are not confused with previous records that had the same id. Oracle does not need the Identity(1,1) descriptor. |
| FamilyFieldId | Int 4, not NULL | FieldId, starting at 1 |
| FamilyFieldName | Varchar 50, not NULL | name of field |
| FamilyFieldType | Int 4, not NULL | Type of field. For now, all fields must be object data fields, valid types are<br>12 – TextField<br>13 – MultiTextField<br>14 – ImageField.<br>15 – MultiImageField<br>16 – SoundField (NYI)<br>17 – MultiSoundField, NYI<br>18 – VideoField, NYI<br>19 – MultiVideoField, NYI<br>20 – NOT USED<br>21 – NOT USED<br>22 – ExtField, NYI<br>23 – MultiExtField, NYI<br>31 – MultiTemplateField, NYI<br>32 – PDFDocumentField, NYI<br>33 – MultiPDFDocumentField, NYI |
| LookupTableId | Int 4, not NULL | The table Id of the object table that this field's values correspond to. |

Create a Clustered, Non-unique Index on FamilyFieldId

Family Record Values Table

This holds the values set for the Family Fields for all family items. This table is like the Attribute _c_ and _f_ table in that if a family item does not have a value set, nothing is stored.

The name of this table is
_A2i_FamilyRecVals_

| SQL field name | SQL Field Type | Description |
|---|---|---|
| FamilyItemId | Int 4, not NULL | Family Item Id |
| FamilyFieldId | Int 4, not NULL | Family Field Id |
| Value | Int 4, not NULL | Value. This corresponds to a record in the object table linked to this field. This cannot be 0. If more than one value are set for a field (multi-valued fields) there will be more than one entry in this table for that field |

Create a Clustered, Non-unique Index on FamilyItemId
Create a Unique Index on FamilyItemId, FamilyFieldId, Value Family Record Values Recycled Table This holds information for deleted family items that had fields set The name of this table is
_A2i_FamilyRecValsRecycled_

| SQL field name | SQL Field Type | Description |
|---|---|---|
| FamilyItemId | Int 4, not NULL | Family Item Id |
| FamilyFieldId | Int 4, not NULL | Family Field Id |
| Value | Int 4, not NULL | Value. This corresponds to a record in the object table linked to this field. This cannot be 0. If more than one value are set for a field (multi-valued fields) there will be more than one entry in this table for that field |

Create a Clustered, Non-unique Index on FamilyItemId
Create a Unique Index on FamilyItemId, FamilyFieldId, Value Family Column Names Table This holds information about family column names.

The name of this table is
_A2i_FamilyColumnNames_

| SQL field name | SQL Field Type | Description |
|---|---|---|
| FamilyItemId | Int 4, not NULL | Family Item Id |

| | | |
|---|---|---|
| FamilyOrAttrId | Int 4, not NULL | Field or Attribute Id this value corresponds to |
| IsAttributeField | Bit, not NULL | Whether this is a lookup field value, or attribute text value linked to this field. This cannot be 0. If more than one value are set for a field (multi-valued fields) there will be more than one entry in this table for that field |
| Rating | Tinyint, not NULL | ???????? |
| DisplayName | Varchar 255, not NULL | Displayed name for the column |

5  Create a Unique Index on FamilyItemId, FamilyOrAttrId, Rating

Large Object (Lob) Data Tables (images, video, etc)

The organization and structure of large object data (sometime referred to as external or indirect data) is stored in the SQL database. The xCat Server does not cache it.

_A2i_CM_Data_Tables_

This describes the structure of the data tables. These data tables have names _A2i_Data_x_ where x is an Id starting at 1.

| SQL field name | SQL Field Type | Description |
|---|---|---|
| DataTableId | Int 4, not NULL, Primary Key. | Id starting at 1 of the Data Table. The table names will be _A2i_Data_x_ where x is this Id. |
| PermanentId | Int 4, not NULL, Identity (1, 1) | Ever increasing Id used to make sure newly added records are not confused with previous records that had the same id. Oracle does not need the Identity(1,1) descriptor. |
| DataTableType | Int 4 not NULL | Type of table, valid values are: 5, 6, 7, 8, 18 Refer to the Table Type Schedule for a list of TableType values and a description of each. |
| DataTableName | Varchar 255, not NULL | Name of table |

Create a Primary, Unique index on DataTableId

_A2i_CM_Data_Groups_

This is a table of user defined groups that the external data items can be assigned to. It is a way to categories the data items for easy searching at a later time. Each record is a group.

| SQL field name | SQL Field Type | Description |
|---|---|---|
| Id | Int 4, not NULL, Primary Key. | Id of this group starting at 1 |
| ParentId | Int 4 not NULL | Id of this group's parent. This must be -1 for top level groups or an existing Id in this table for child groups |
| GroupName | Varchar 255, not NULL | Name of group |

Create a Primary, Unique index on Id
NOTE: Do not insert a null record

_A2i_CM_Data_Locations_

This hierarchical table describes exactly where the data items are. Data items are assigned ids from this table to specify exactly where they are.

| SQL field name | SQL Field Type | Description |
| --- | --- | --- |
| Id | Int 4, not NULL, Primary Key. | Id of this location starting at 1 |
| ParentId | Int 4, not NULL | Id of this location's parent. This must be -1 for top level locations or an existing Id in this table for child locations. |
| Name | Varchar 50, Not NULL | Name of location. Each name is part of a universal path, so the name must conform to file and directory naming restrictions. No backslashes \ are allowed in the name. |
| Type | Int 4, not NULL | Type of location. Valid types and their meanings are: |
| | | 1 - PhysicalLocation, This is a physical location such as A2I, Century City Office, or Server Room. PhysicalLocations start at the top of the hierarchy. |
| | | 2 - ComputerLocation, This is the network name of the computer where item data can reside. These locations appear direcly under Physical Locations and before any volume information. |
| | | 3 - SharedFixedDeviceLocation, This is a shared network volume such as big_vol, data or catalogs. It comes after ComputerLocation and before RelativePathLocation in the hierarchy. |
| | | 4 - LocalFixedDeviceLocation, This is a local permanent disk drive. Usually named c$ or d$ to indicate the c: or d: drive. It comes after ComputerLocation and before RelativePathLocation in the hierarchy. |
| | | 5 - RemovableDeviceLocation, This is a local removeable drive such as a cd-rom drive. It is usually named e$ to indicate the e: drive. This comes after ComputerLocation and before RemovableMediaLocation in the hierarchy. |
| | | 6 - RemovableMediaLocation, This is the volume name of the removable disk. It comes after the RemovableDeviceLocation and before RelativePathLocation. |
| | | 7 - RelativePathLocation, This is a part of a relative path on a drive. It represents 1 directory. Subdirectories will be be children of their parent RelativePathLocations. |

Create a Primary, Unique index on Id
NOTE: the description field has been removed Each record represents 1 part in a part of locations. And example is
A2iUSA\Dave_Office\sullivan\d$\work\images\testImages The records that make this up would be:
(Id, ParentId, type, name)
1, -1, PhysicalLocation,      A2iUSA
2,  1, PhysicalLocation,      Dave_Office
3,  2, ComputerLocation,      sullivan
4,  3, LocalFixedDeviceLocation,   d$
5,  4, RelativePathLocation,  work
6,  5, RelativePathLocation,  images
7,  6, RelativePathLocation,  testImages _A2i_G_x_

This table is no longer used and can be removed from any existing databases

_A2i_CM_Data_Views_

This table is no longer used and can be removed from any existing databases

_A2i_CM_Publications_

| SQL field name | SQL Field Type | Description |
|---|---|---|
| Id | Int 4, not NULL, Primary Key. | Id of this publication starting at 1 |
| Name | Varchar 255 | name of the publication |

Create a Primary, Unique index on Id

_A2i_Publications_x_

This table describes a publication, represented as a tree. "x" in the table name corresponds to an entry in the _A2i_CM_Publications_ table.

| SQL field name | SQL Field Type | Description |
|---|---|---|
| Id | Int 4, not NULL | Id of this record, starting at 1 |
| Parent | Int 4, not NULL | Record Id of this record's parent, root id's parent is –1 |
| Type | Int 4, not NULL | Publication type:<br>1 - ??? (To Be Determined)<br>2 - ??? (etc) |
| Position | Int 4, not NULL | Position relative to other siblings of the same parent, starting at 1 |
| Parent | Int 4, not NULL | Record Id of this record's parent, root id's parent is –1 |
| Name | Varchar 255 | Displayed name of the publication |
| Data | Image, not NULL | Binary Object. Structure is ? |

Create a Primary, Unique index on Id

_A2i_CM_Media_

This table contains user-defined descriptions of the media type of the item data.

| SQL field name | SQL Field Type | Description |
|---|---|---|
| Id | Int 4, not NULL, Primary Key. | Id of this media type starting at 1 |
| Media | Varchar 50 | name of the media |
| ParentId | Int 4, not NULL | Id of parent media type. Top level media types have a ParentId of -1 |

Create a Primary, Unique index on Id

_A2i_Data_x_

These tables contain the definitions of the data items. Each record represents a single data item. All data tables have the first 5 fields in common.

| SQL field name | SQL Field Type | Description |
|---|---|---|
| DataId | Int 4, not NULL, Primary Key. | Id of this data item starting at 1, there is no record 0. |
| OrigMediaId | Int 4, not NULL, default 0 | Id of the original media type, must be zero (indicating that no media type is assigned) or a valid Id in the _A2i_CM_Media_ table |
| OrigLocationId | Int 4, not NULL, default 0 | Id of the original location, must be a valid Id in the _A2i_CM_Locations_ table |
| DataGroupId | Int 4, not NULL, default 0 | Id of the group this item belongs to. Must be a valid Id in the _A2i_CM_Data_Groups_ table |
| DataSize | Int 4, not NULL, default 0 | Size in bytes of the stored data object. For the TextTable type, the size is the sum of both TextStart and TextRest |

Create Primary, Unique index on DataId

Each type of data table (text, image, pdf, video, sound) has additional fields. Currently only the image, text and pdf tables are fully defined.

Text Table (Type 5) additional fields

| SQL field name | SQL Field Type | Description |
|---|---|---|
| TextStart | Varchar 255, not NULL | first 255 characters of text |
| TextRest | Text | Remaining text | no other supporting tables

PDF Table (Type 18) additional fields

| SQL field name | SQL Field Type | Description |
|---|---|---|
| OrigName | Varchar 255, not NULL | Original name of this item |
| HasOriginal | Bit, not NULL, default 0 | Specifies whether or not the original pdf is stored in the sql database. If so, there will be a record with the same DataId in the corresponding _A2i_Originals_x_ table which resides in the [DatabaseName] Originals database |

PDF tables have supporting tables in the {database}_Originals or {database}O database.
The supporting table is _A2i_Originals_x_ where x matches the Id of the main database table

| SQL field name | SQL Field Type | Description |
|---|---|---|

| DataId | Int 4, not NULL | Id matching Id in main database |
|---|---|---|
| PDF | Image, not NULL | Actual pdf document |

Image Table (Type 6) additional fields

| SQL field name | SQL Field Type | Description |
|---|---|---|
| OrigName | Varchar 255, not NULL | Original name of this item |
| ProcessedName | Varchar 255, not NULL | Optional new name after processing |
| Width | Int 4, not NULL. | Width in pixels of image |
| Height | Int 4, not NULL | Height in pixels of image |
| HasOriginal | Bit, not NULL | Specifies whether or not the original images is stored in the sql database. If so, there will be a record with the same DataId in the corresponding _A2i_Originals_x_ table which resides in the [DatabaseName]Originals database |
| Format | Int 4, not NULL | Format of the image.<br>1 - BMP<br>2 - GIF<br>3 - JPEG<br>4 - TIFF<br>5 - PCD<br>6 - EPS<br>7 - PNG<br>8 - PSD |
| Zipped | Bit, not NULL | Specifies if the original image stored in the database is zipped. |

Image tables have support tables in the {database}_Originals and {database}_Thumbnails databases.

In the {database}_Originals or {database}O, the supporting table is _A2i_Originals_x_ where x matches the Id of the main database table

| SQL field name | SQL Field Type | Description |
|---|---|---|
| DataId | Int 4, not NULL | Id matching Id in main database |
| Original | Image, not NULL | Original (not altered) image |

In the {database}_Thumbnails or {database}T, the supporting table is _A2i_Thumbnails_x_ where x matches the Id of the main database table

| SQL field name | SQL Field Type | Description |
|---|---|---|
| DataId | Int 4, not NULL | Id matching Id in main database |
| Thumbnail | Image, not NULL | Thumbnail image generated from the original, currently bounded by (200 x 200) box. |

For each _A2i_Originals_x_ and _A2i_Thumbnails_x_, create a unique primary index on DataId.

Image Variant Tables

Images in the Catalog Manager can be processed to various specifications and stored. An Image Variant is the term used to describe a processed image.

_A2i_Img_Filters_

Filters table. (Currently not used)

| SQL field name | SQL Field Type | Description |
|---|---|---|
| FilterId | Int 4, not NULL | Id of the filter. |
| Filter | Image, not NULL | |

Create a Unique index on FilterId

_A2i_Img_Scripts_

Scripts table. (Currently not used)

| SQL field name | SQL Field Type | Description |
|---|---|---|
| ScriptId | Int 4, not NULL | |
| ScriptName | Varchar 50, not NULL | |

Create a Unique index on ScriptId

_A2i_Img_SF_

Script-Filter table. (Currently not used)

| SQL field name | SQL Field Type | Description |
|---|---|---|
| ScriptId | Int 4, not NULL | |
| FilterId | Int 4, not NULL | |

Create a Unique index on ScriptId, FilterId

_A2i_Img_Variants_

Variants Table. This is the directory for all Variant tables in the database.

| SQL field name | SQL Field Type | Description |
|---|---|---|
| VariantId | Int 4, not NULL | Id of this Variant |
| VariantName | Varchar 128, not NULL | Name of the variant |
| Width | Int 4, not NULL | Bounding Width |
| Height | Int 4, not NULL | Bounding Height |
| OptimizeStorage | Int 4, not NULL | |
| IVScalingMode | Int 4, not NULL | |
| OutputResolution | Int 4, not NULL | |
| IVColorMode | Int 4, not NULL | |
| IVPaletteType | Int 4, not NULL | |

| IvColorReductionMethod | Int 4, not NULL | |
|---|---|---|
| IccProfile | Varchar 255, not NULL | Path of ICC Profile |
| GammaCorrection | Int 4, not NULL | |
| IVOutputFormat | Int 4, not NULL | |
| IVSubformat | Int 4, not NULL | |
| AddBorders | Int 4, not NULL | |
| BorderRGB | Int 4, not NULL | |
| BorderTopPixels | Int 4, not NULL | |
| BorderBottomPixels | Int 4, not NULL | |
| BorderLeftPixels | Int 4, not NULL | |
| BorderRightPixels | Int 4, not NULL | |
| AddWatermark | Int 4, not NULL | |
| IVWatermarkType | Int 4, not NULL | |
| WatermarkSize | Int 4, not NULL | |
| IVWatermarkPosition | Int 4, not NULL | |

Create Primary, Unique index on VariantId

_A2i_Img_VIS_

Variant-Image-Script table. There is only one _A2i_Img_VIS_ table in one database. This table stores information about all Variant images.

| SQL field name | SQL Field Type | Description |
|---|---|---|
| VariantId | Int 4, not NULL | |
| ImageId | Int 4, not NULL | |
| ScriptId | Int 4, not NULL | |
| Status | Int 4, not NULL | |
| DataSize | Int 4, not NULL | |
| Width | Int 4, not NULL | |
| Height | Int 4, not NULL | |
| Format | Int 4, not NULL | |

Create an index on VariantId
Create a Unique index on VariantId, ImageId

_A2i_Images_

The actual image variant data is stored in a Variant database (its name is stored in table A2i_xCat_DBs). There's only one table in this database named as "_A2I_Images_"

| SQL field name | SQL Field Type | Description |
|---|---|---|
| DataTableId | Int 4, not NULL | |
| VariantId | Int 4, not NULL | |
| DataId | Int 4, not NULL | |

| Variant | Image, not NULL | |
|---|---|---|
| CrcOfOriginal | Int 4, Not NULL | CRC of Original Image when Variant was set |

5   Create a Unique index on DataTableId, VariantId, DataI

What is claimed is:

1. In a database system, a method for structuring families of data items comprising:

obtaining a non-empty set of family items from a main table in a database wherein each family item selected from said non-empty set of family items represents at least one first field value found in a first field in at least one record of said main table in said database and wherein said family item is not accessed if said at least one first field value associated with said family item does not exist within said first field in any row of said main table in said database;

assigning a family identifier to each of said non-empty set of family items wherein said family identifier does not comprise a one to one correspondence to a category identifier found in a category field of said main table in said database;

building a hierarchy between said non-empty set of family items in a family table wherein said family table is separate from said main data table and wherein a child family is associated with an additional at least one second field having a second field value found in said main table and associated with said family identifier and wherein a parent family is not associated with said additional at least one second field value and wherein said family identifier and said at least one second field are stored in a family partition table;

providing an indirect partition of data records of said main table via said family table wherein a family identifier is not stored in any field in any record of said main table in said database; and managing said set of family items and said hierarchy in said family table in response to a change in said data records in said main table by deleting any family items in said family table that no longer have associated field values in an associated field in any row of said main table of said database when a first record is deleted from said database and adding at least one new family item when a new record comprising a new field value is inserted into said main table of said database.

2. In a database system, a method for structuring families of data items comprising:

obtaining a non-empty set of family items from a main table in a database wherein each family item selected from said non-empty set of family items represents at least one first field value found in a first field in at least one record of said main table in said database and wherein said family item is not accessed if said at least one first field value associated with said family item does not exist within said first field in any row of said main table in said database;

assigning a family identifier to each of said non-empty set of family items wherein said family identifier does not comprise a one to one correspondence to a category identifier found in a category field of said main table in said database;

building a hierarchy between said non-empty set of family items in a family table wherein said family table is separate from said main data table and wherein a child family is associated with an additional at least one second field having a second field value found in said main table and associated with said family identifier and wherein a parent family is not associated with said additional at least one second field value and wherein said family identifier and said at least one second field are stored in a family partition table;

providing an indirect partition of data records of said main table via said family table wherein a family identifier is not stored in any field in any record of said main table in said database; and managing said set of family items and said hierarchy in said family table in response to a change in said data records in said main table by deleting any family items in said family table that no longer have associated field values in an associated field in any row of said main table of said database when a first record is modified in said database and adding at least one new family item when a new record comprising a new field value is modified in said main table of said database.

* * * * *